(12) United States Patent
Baligh et al.

(10) Patent No.: US 10,805,972 B2
(45) Date of Patent: Oct. 13, 2020

(54) SYSTEM AND METHOD FOR COORDINATING DEVICE-TO-DEVICE COMMUNICATIONS

(71) Applicants: Mohammadhadi Baligh, Ottawa (CA); Keyvan Zarifi, Ottawa (CA); Jianglei Ma, Ottawa (CA)

(72) Inventors: Mohammadhadi Baligh, Ottawa (CA); Keyvan Zarifi, Ottawa (CA); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/404,882

(22) Filed: May 7, 2019

(65) Prior Publication Data
US 2019/0261443 A1 Aug. 22, 2019

Related U.S. Application Data

(63) Continuation of application No. 15/459,166, filed on Mar. 15, 2017, now Pat. No. 10,568,153, which is a
(Continued)

(51) Int. Cl.
*H04W 24/00* (2009.01)
*H04W 76/14* (2018.01)
(Continued)

(52) U.S. Cl.
CPC ....... *H04W 76/14* (2018.02); *H04W 28/0278* (2013.01); *H04W 40/02* (2013.01);
(Continued)

(58) Field of Classification Search
None
See application file for complete search history.

(56) References Cited

U.S. PATENT DOCUMENTS 9,319,955 B2  4/2016 Kim et al.
9,668,194 B2  5/2017 Baligh et al.
(Continued)

FOREIGN PATENT DOCUMENTS

CA  2880885 C  7/2019
CN  102905334 A  1/2013
(Continued)

OTHER PUBLICATIONS

Fujitsu, Cluster-based unified approach to D2D direct communication, 3GPP TSG-RAN1 #74 R1-133140, published Aug. 19, 2013, pp. 1-6.
(Continued)

*Primary Examiner* — Gary Lafontant

(57) ABSTRACT

A master user equipment (UE) device may coordinate device-to-device (D2D) communications amongst a plurality of UE devices. For example, a UE device, which has been designated as a master UE device, may coordinate a D2D communication between a first UE device and a second UE device. The master UE device may be a UE device that obtains an indication that it is a master UE device that is to coordinate D2D communications amongst the plurality of UE devices. In some embodiments, the coordinating the D2D communication may be on behalf of a network and/or to facilitate wireless communication between the network and at least one of the plurality of UE devices.

20 Claims, 13 Drawing Sheets

Related U.S. Application Data continuation of application No. 14/609,644, filed on Jan. 30, 2015, now Pat. No. 9,668,194.

(51) Int. Cl.
*H04W 40/02* (2009.01)
*H04W 40/20* (2009.01)
*H04W 40/22* (2009.01)
*H04W 28/02* (2009.01)
*H04W 40/16* (2009.01)
*H04W 84/20* (2009.01)

(52) U.S. Cl.
CPC .......... *H04W 40/16* (2013.01); *H04W 40/20* (2013.01); *H04W 40/22* (2013.01); *H04W 84/20* (2013.01); *Y02D 70/00* (2018.01); *Y02D 70/142* (2018.01); *Y02D 70/144* (2018.01); *Y02D 70/164* (2018.01); *Y02D 70/21* (2018.01); *Y02D 70/30* (2018.01); *Y02D 70/38* (2018.01); *Y02D 70/39* (2018.01)

(56) References Cited

U.S. PATENT DOCUMENTS

| | | |
|---|---|---|
| 2011/0268004 A1 | 3/2011 | Doppler et al. |
| 2013/0287012 A1 | 10/2013 | Pragada et al. |
| 2013/0288668 A1* | 10/2013 | Pragada ................ H04L 67/16 455/426.1 |
| 2013/0324114 A1 | 12/2013 | Raghothaman et al. |
| 2014/0018010 A1 | 1/2014 | Gao et al. |
| 2014/0036718 A1* | 2/2014 | Gao ..................... H04W 72/121 370/254 |
| 2014/0099958 A1* | 4/2014 | Wilhelmsson ........ H04W 36/30 455/437 |
| 2015/0282142 A1* | 10/2015 | Dahlman ............. H04W 84/20 370/329 |
| 2016/0183219 A1 | 6/2016 | Kim et al. |
| 2017/0188406 A1 | 6/2017 | Baligh et al. |

FOREIGN PATENT DOCUMENTS

| | | |
|---|---|---|
| CN | 103238306 A | 8/2013 |
| CN | 103580791 A | 2/2014 |
| CN | 104412698 A1 | 3/2015 |
| CN | 104429150 A | 3/2015 |
| EP | 2717622 A1 | 4/2014 |
| WO | 2013022471 A1 | 2/2013 |
| WO | 2014090204 A1 | 6/2014 |
| WO | 2014208370 A1 | 12/2014 |
| WO | 2015119538 A1 | 8/2015 |

OTHER PUBLICATIONS

International Search Report and Written Opinion of PCT/IB2015/058717, dated Feb. 18, 2016, p. 1-11.

ZTE Resource Allocation of D2D communication, 3GPP TSG-RAN WG1 Meeting #74bis, Oct. 11, 2013, pp. 1-6.

* cited by examiner

SYSTEM AND METHOD FOR COORDINATING DEVICE-TO-DEVICE COMMUNICATIONS

RELATED APPLICATION

This is a continuation of U.S. patent application Ser. No. 15/459,166, which was filed on Mar. 15, 2017, which is entitled "System and Method for Coordinating Device-To-Device Communications," which is incorporated herein by reference and which is in turn a continuation of U.S. patent application Ser. No. 14/609,644, which was filed on Jan. 30, 2015, which is entitled "System and Method for Coordinating Device-to-Device Communications", and which is also incorporated herein by reference.

FIELD

The following relates to coordinating device-to-device communications amongst a plurality of devices.

BACKGROUND

In a traditional mobile network, all communication between user equipment (UE) devices goes through a base station, even if two UE devices communicating with each other are in close physical proximity.

Device-to-device (D2D) communication has more recently been introduced to allow for UE devices in close physical proximity to directly communicate with each other without using the base station.

As the number of UE devices in a mobile network increases, there may be more potential opportunities for D2D communication.

SUMMARY

Embodiments are described in which a master UE device may coordinate D2D communications amongst a plurality of UE devices.

The master UE device may be a UE device of the plurality of UE devices that obtains an indication that it is to be a master UE device. The master UE device may then coordinate a D2D communication between a first UE device and a second UE device. This may be done by transmitting an instruction to at least the first UE device to coordinate the D2D communication.

Coordinating D2D communications between UE devices may involve organizing and/or controlling the D2D communications. For example, the coordinating may comprise instructing two UE devices to perform a D2D communication. As another example, the coordinating may comprise controlling use of the wireless channel for a D2D communication between two UE devices to mitigate interference with D2D communications of other UE devices. As another example, the coordinating may comprise determining and/or instructing one or more UE devices to be a "helper" to use D2D communication with one or more "target" UE devices in order to assist with wireless communication between a network and the one or more target UE devices.

In another embodiment, a UE device is provided which may include processing circuitry configured to implement a D2D coordinator. The D2D coordinator may coordinate the D2D communications. The UE device may include other hardware also, for example, at least one antenna to communicate with a network, and to communicate with other UE devices using D2D communication.

BRIEF DESCRIPTION

Embodiments of the present application will be described, by way of example only, with reference to the accompanying figures wherein.

Like reference numerals are used in different figures to denote similar elements.

DETAILED DESCRIPTION

Figure 1:
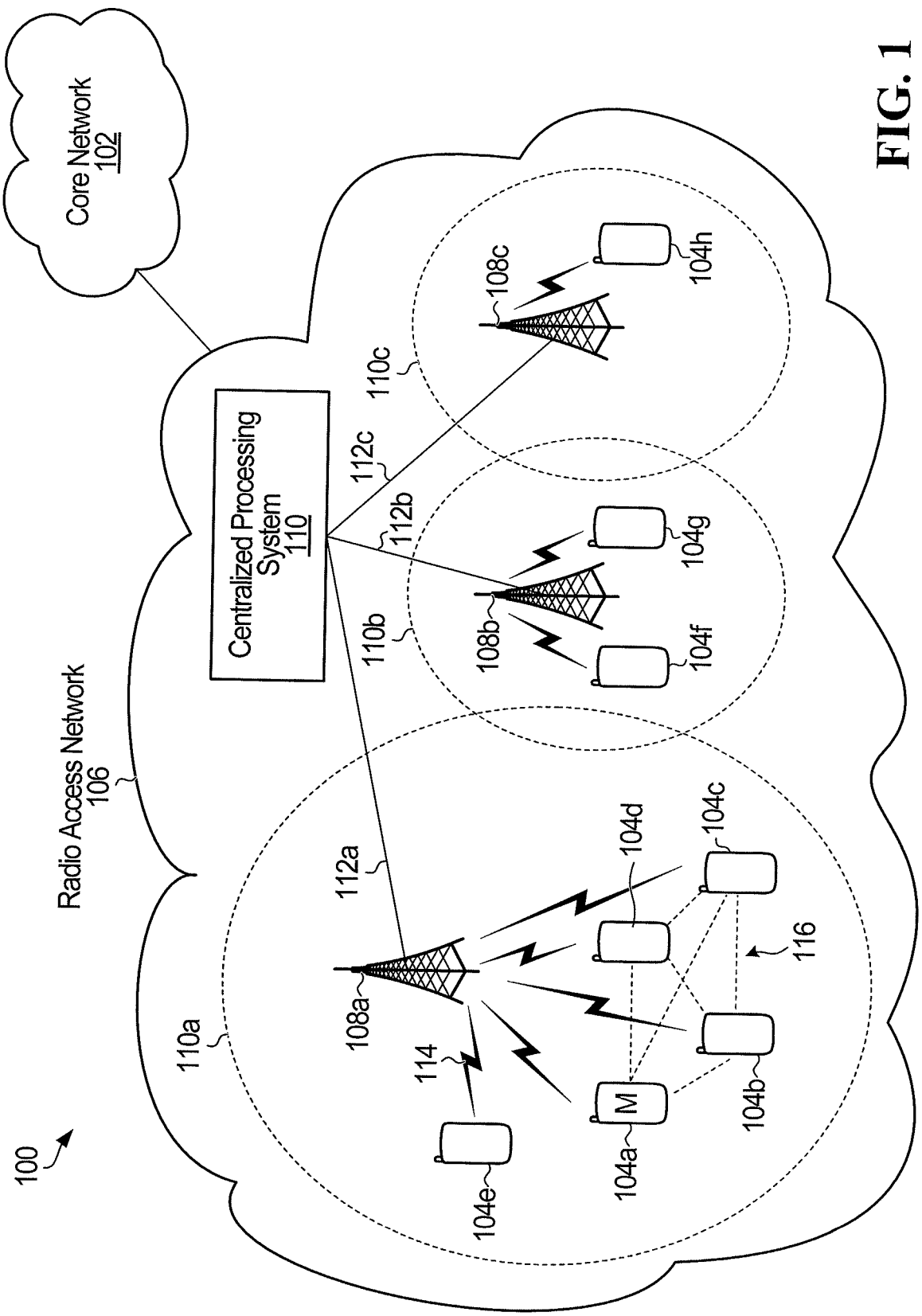
FIG. 1 shows an example of a telecommunications network in accordance with one embodiment.

For illustrative purposes, specific example embodiments will now be explained in greater detail below in conjunction with the figures.

The embodiments set forth herein represent information sufficient to practice the claimed subject matter and illustrate the best way of practicing such subject matter. Upon reading the following description in light of the accompanying figures, those of sufficient skill will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

Turning now to the figures, some specific example embodiments will be described.

Establishment of a Master UE Device:

When multiple UE devices are performing D2D communications, there may be a lack of coordination between the UE devices. For example, there may be no process (or no efficient distributed process) for controlling wireless channel access for the D2D communications amongst the UE devices to try to prevent interference between the D2D communications. In particular, a carrier sensing multiple access process, or something similar, which may be employed by the UE devices on an ad hoc basis to transmit the D2D communications, may not provide adequate quality of service (QoS) or scale well as the number of UE devices participating in the D2D group grows. In some cases, the ad hoc D2D communications between the UE devices may result in conflicts or collisions, resulting in less effective or ineffective D2D cooperation between the plurality of UE devices, due to the lack of coordination. As another example, if the UE devices are working together in a cooperative D2D group to communicate with a network, there may be no process for facilitating communication between the network and the D2D group. For example, there may be no process for determining which (if any) UE devices are to be "helpers" and which (if any) UE devices are to be "targets", where a helper uses D2D communication with a target to assist in a wireless communication between the network and the target.

In view of this, a "master" UE device may be established to coordinate the D2D communications between the UE devices. Examples relating to the establishment and role of the master UE device will be explained below in the context of specific embodiments.

Example of a Telecommunications Network and a Master UE Device:

FIG. 1 shows an example of a telecommunications network 100 in accordance with one embodiment. The telecommunications network 100 includes a core network 102 and a radio access network 106. The core network 102 is the central part of the telecommunications network 100 and provides various services, such as (for example) call control/switching and gateways to other networks. The core network 102 comprises network components such as routers, switches, and servers.

Connected or coupled to the core network 102 is the radio access network 106, which in the illustrated embodiment is a cloud radio access network (C-RAN). A C-RAN is sometimes also referred to as a Centralized-RAN. UE devices 104a, 104b, 104c, 104d, 104e, 104f, 104g, and 104h, which also may be referred to as nodes, wirelessly access the telecommunications network 100 using the radio access network 106. It will be appreciated that although a C-RAN is described with respect to the figures, this is only an example, and the present disclosure is just as applicable in the context of other access networks.

The radio access network 106 includes a plurality of remote radio heads (RRHs), three of which are illustrated: RRH 108a, 108b, and 108c. Each one of the RRHs 108a-c provides a respective wireless coverage area 110a, 110b, and 110c. Each RRH 108a-c may be implemented using a radio transceiver, one or more antennas, and associated processing circuitry (e.g. antenna RF circuitry, analog-to-digital/digital-to-analog converters, etc.).

Each RRH 108a-c is connected to a centralized processing system 110 in the radio access network 106 via a respective communication link 112a, 112b, and 112c. The communication links 112a-c may each be a fibre communication link. Each RRH 108a-c includes circuitry for transmitting data to the centralized processing system 110 and for receiving data from the centralized processing system 110 via its respective communication link 112a-c.

The centralized processing system 110 may be implemented by a network of one or more processing and control servers. Alternatively, the centralized processing system 110 may comprise a single server. In the context of a C-RAN, the centralized processing system 110 may include one or more baseband units (BBUs), which may perform baseband processing of data for/from the UE devices 104a-h.

Each of RRH 108a-c is an example of a base station in that each RRH 108a-c comprises a radio receiver/transmitter that a UE device wirelessly communicates with to access the radio access network from within its respective wireless coverage area. A base station may serve as the gateway between the wireline and wireless portion of the radio access network 106, although this need not be the case (e.g. the communication links 112a-c could be wireless). Base stations may be placed at fixed locations by the network provider, for example, in a strategic manner to provide a continuous wireless coverage area. This is shown in FIG. 1 in that wireless coverage areas 110a, 110b, and 110c overlap each other so that all of UE devices 104a-h may move throughout the wireless coverage areas 110a-c, from one wireless coverage area to another, and be served by the radio access network 106. A base station may also be referred to as a base transceiver station, a radio base station, a network node, a transmit node, a Node B, or an eNode B, depending upon the implementation.

Although each of RRH 108a-c is considered to be a base station, it will be appreciated that the RRHs 108a-c may have fewer processing capabilities compared to previous generations of base stations, since such processing capabilities may instead be offloaded to the central processing unit 110, as per the C-RAN architecture.

Each one of the UE devices 104a-h in FIG. 1 is able to wirelessly communicate with an RRH. For example, UE device 104e can wirelessly communicate with RRH 108a, as shown at 114.

The four UE devices 104a, 104b, 104c, and 104d are in close physical proximity to each other. For example, the users of UE devices 104a-d may each be attending the same event and situated close to each other, or they may be four friends or family members in the same house or in the same car. Although the UE devices 104a-d can each wirelessly communicate with the RRH 108a, they can also directly communicate with each other using D2D communications 116. A D2D communication is a direct communication between UE devices that does not go through an access network component, such as a base station. As shown in FIG. 1, communications 116 are directly between the UE devices and are not routed through the base station, or any other part of the network 106. D2D communications may also sometimes be referred to as lateral communications. On the other hand, a communication between an access network component, such as a base station, and a UE device (e.g. communication 114) is called an "access communication", which may be said to occur over an access channel.

The D2D connections between the UE devices 104a-d may have been established using a discovery process. One example of a discovery process is as follows: each UE device 104a-d periodically sends out a discovery message or signal to determine if there are neighbouring UE devices in physical proximity to set up a D2D communication link. Each UE device 104a-d also periodically listens for such discovery messages. When a discovery message is received, the D2D communication link between the receiver and the sender can be set up via a predetermined protocol. Another example of a discovery process is as follows: one or more of UE devices 104a-d receives a message from the RRH 108a (originating in the radio access network 106), the message indicating that there is another UE device in close physical proximity. Upon receipt of this message, the UE device then transmits a discovery message (or listens for a discovery message) to set up a D2D communication link with the other UE device. Another example discovery process is as follows: the human users of the UE devices 104a-d decide that they want to set up D2D communication links, and therefore come within close physical proximity to each other and manually instruct their respective UE devices to set up a D2D communication link. This manual prompt causes the UE devices to send and/or receive discovery messages to set up the D2D communication links.

Referring to FIG. 1, once the D2D connections are established, the UE devices 104a-d may be considered members of a D2D group, forming an ad hoc system for directly communicating with each other using D2D communications. As will be appreciated, the D2D coordination methods described herein are applicable to D2D groups with any number of devices, although some of the methods may be more suitable for D2D groups that comprise at least three UE devices.

The D2D communications between the UE devices 104a-d may have a benefit in that the UE devices 104a-d may assist each other with wireless communications (e.g. transmission(s) and/or reception(s)) between the UE devices 104a-d and the RRH 108a. A D2D group that works together to assist or facilitate communication between members of the D2D group and the network may sometimes be referred to as a cooperative UE group, as the D2D group members are cooperating with each other using D2D communications. As a simple example, if UE device 104c fails to correctly decode a packet received from the RRH 108a, but if UE device 104d is able to receive and correctly decode the packet, then UE device 104d could directly transmit the decoded packet to UE device 104c using D2D communication.

In some embodiments, the D2D group may be viewed by the radio access network 106 as a single virtual entity, called a "virtual user equipment" (VUE).

While FIG. 1 shows that all of the UE devices 104a-d communicate with the same base station (RRH 108a), in general, different ones of the UE devices 104a-d may communicate with different base stations. As an example, if UE device 104d happened to instead be located in coverage area 110b (i.e. the D2D group was spread across coverage areas 110a and 110b), then UE device 104d may directly communicate with RRH 108b, or UE device 104d may indirectly communicate with RRH 108a through other ones of the plurality of UE devices that are within the wireless coverage area of RRH 108a. For example, UE device 104d may send a message directly to UE device 104a using D2D communication, and UE device 104a may then forward that message to RRH 108a.

As mentioned earlier, a lack of coordination between UE devices in a D2D group may be a problem. In view of this, one of the plurality of UE devices 104a-d acts as a master UE device, which in FIG. 1 is UE device 104a, and is designated by the letter "M". Example ways to establish a particular UE device as a master UE device are described later. One task of the master UE device 104a may be to coordinate the D2D activities and communications amongst the plurality of UE devices 104a-d such that there is centralized organization of the UE devices 104a-d and their D2D communications. Examples of such coordinating activities are described in detail later.

Figure 2:
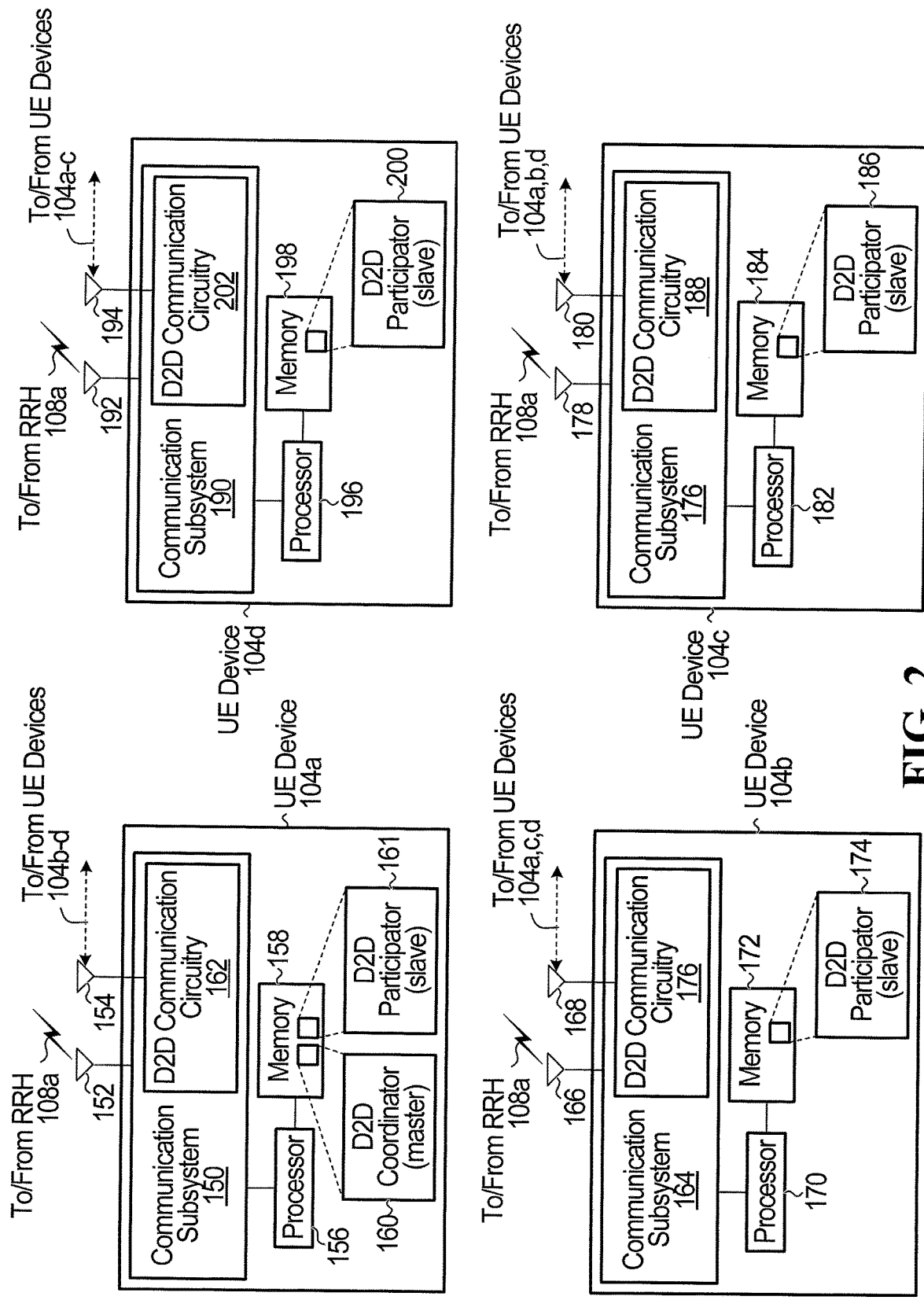
FIG. 2 shows an example of a D2D group of UE devices from the embodiment illustrated in FIG. 1.

FIG. 2 shows the UE devices 104a-d in more detail. The master UE device 104a includes a communication subsystem 150, two antennas 152 and 154, a processor 156, and a memory 158. The master UE device 104a also includes a D2D coordinator 160 and a D2D participator 161, the functionality of which will be explained below.

The communication subsystem 150 comprises processing and transmit/receive circuitry for sending information from and receiving information at the UE device 104a. Although one communication subsystem 150 is illustrated, it could instead be multiple communication subsystems.

The communication subsystem 150 includes D2D communication circuitry 162 for performing D2D communications between the master UE device 104a and one, some, or all of the UE devices 104b-d. This circuitry 162 can comprise dedicated processing and transmit/receive circuitry, although it will be appreciated that more generally dedicated circuitry may not be required.

In FIG. 2 one antenna 152 transmits wireless communication signals to, and receives wireless communications signals from, the RRH 108a, and another separate antenna 154 transmits D2D communication signals to, and receives D2D communication signals from, the UE devices 104b-d. However, more generally, it will be appreciated that one or more antennas may be used for transmitting/receiving D2D communication signals, and these one or more antennas may be different from or the same as one or more antennas used for transmitting/receiving the wireless communications to/from the RRH 108a.

The D2D communications between the UE devices 104a-d may be over Wi-Fi, and the antenna 154 may be or include a Wi-Fi antenna. As another example, the D2D communications may be over Bluetooth™, and the antenna 154 may be or include a Bluetooth™ antenna. As another example, the D2D communications may utilize uplink and/or downlink resources (e.g. time slots and/or frequencies) that may be scheduled by the radio access network 106. In general, the D2D communications may be over cellular spectrum (i.e., inband) or unlicensed spectrum (i.e., outband).

The D2D coordinator 160 coordinates the D2D communications amongst the UE devices 104a-d. The D2D coordinator 160 may be functionality implemented in one or more of hardware, firmware, or software in combination with a processor to run the software. In the specific embodiment in FIG. 2, the D2D coordinator 160 is implemented by the processor 156 when the processor 156 accesses and executes a series of instructions stored in the memory 158, the instructions defining the actions of the D2D coordinator 160. When the instructions are executed, it causes the UE device 104a to coordinate D2D communications between the UE devices 104a-d in the manner explained below. In other embodiments, the D2D coordinator 160 may instead (or additionally) comprise dedicated integrated circuitry, such as an application specific integrated circuit (ASIC), or a programmed field programmable gate array (FPGA) for performing one or more of the functions of the D2D coordinator 160. Therefore, more generally, the D2D coordinator 160 is a module or unit that is part of the UE device 104a and that is configured to implement the operations described below.

The D2D participator 161 receives instructions from the D2D coordinator 160 to participate in D2D communications with one or more of the other UE devices 104b-d in the manner explained below. Similarly, although the D2D participator 161 is illustrated as being defined by instructions stored in the memory 158, which are to be executed by the processor 156 to implement the D2D participator 161, this does not necessarily have to be case (e.g. the D2D participator 161 could instead be dedicated circuitry). Therefore, more generally, the D2D participator 161 is also a module or unit that is part of the UE device 104a and that is configured to implement the operations described below.

As shown in FIG. 2, the UE device 104b similarly includes a communication subsystem 164, two antennas 166 and 168, a processor 170, and a memory 172. The UE device 104b also includes a D2D participator 174.

The UE devices 104c and 104d include the same components described above with respect to the UE device 104b. That is, UE device 104c includes communication subsystem 176, antennas 178 and 180, processor 182, memory 184, D2D participator 186, and D2D communication circuitry 188; and UE device 104d includes communication subsystem 190, antennas 192 and 194, processor 196, memory 198, D2D participator 200, and D2D communication circuitry 202.

The D2D coordinator 160 may be considered a master in that the D2D participators 161, 174, 186, and 200 take instructions from the D2D coordinator 160 and cause the D2D communications in the manner instructed by the D2D coordinator 160. In this sense, the D2D participators 161, 174, 186, and 200 may be considered slaves.

FIG. 2 represents a snap-shot in time in which UE device 104a is the master UE device, and so is the only UE device that is illustrated as having a D2D coordinator. However, one or more other of the UE devices 104b-d could also have D2D coordinator functionality, which may be activated if they were instead to become a master UE device. To the extent any of UE devices 104b-d have D2D coordinators also, this has not been illustrated. Also, in some embodiments, it could be that some of UE devices 104a-d are manufactured with D2D coordinator functionality (which means that the UE device could become a master UE device if such functionality is activated), whereas other of the UE devices 104a-d (which may not be as sophisticated) could be manufactured to not have D2D coordinator functionality and may only ever be slaves.

Figure 3:
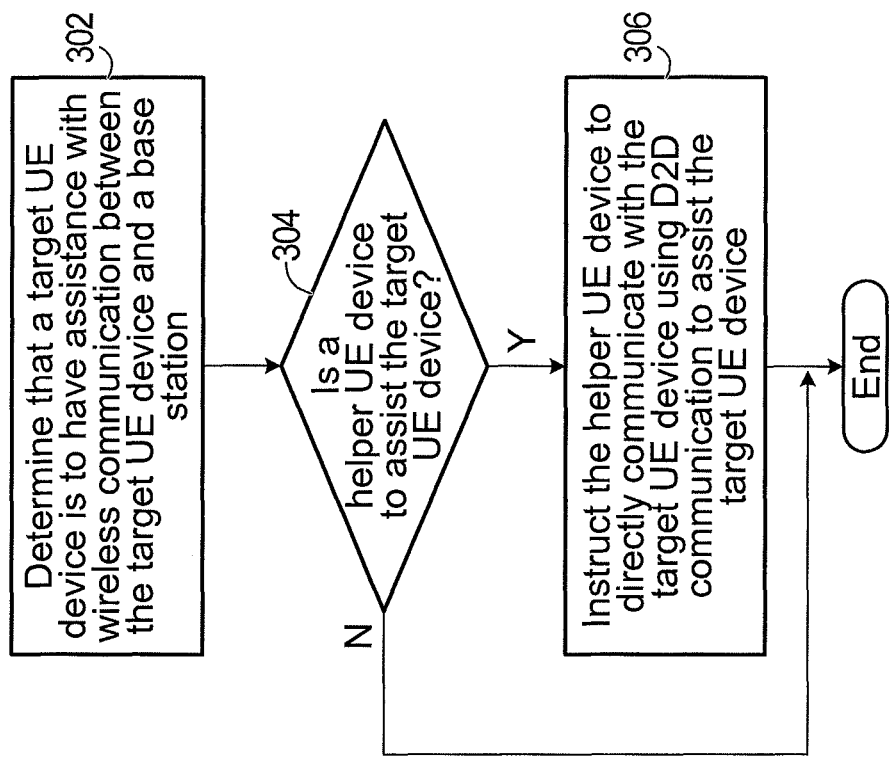
FIG. 3 shows an example of operations performed by a D2D coordinator in accordance with one embodiment.

Example of a Master UE Device Coordinating D2D Communications to Assist with Wireless Communication Between a Network and UE Devices:

In one embodiment, the D2D coordinator 160 is configured to determine which of the plurality of UE devices 104a-d is/are to be assisted, using D2D communications, with wireless communications with the RRH 108a. Specifically, the D2D coordinator 160 in this embodiment is configured to perform the following operations, which are described with reference to FIG. 3.

In step 302, the D2D coordinator 160 determines that one of the UE devices 104a-d, which will be referred to as a "target UE device", is to have assistance with wireless communication between the target UE device and the RRH 108a, where the assistance uses D2D communications. Such assistance may include assistance in transmitting information from the target UE device to the RRH 108a and/or assistance in receiving information from the RRH 108a at the target UE device.

One example way in which the D2D coordinator 160 determines that a target UE device is to have assistance is as follows: the D2D coordinator 160 obtains an indication that the target UE device has requested assistance, and by way of receipt of this indication, the D2D coordinator 160 determines that the target UE is to be assisted. For example, the target UE device may communicate directly with the master UE device 104a using D2D communications to inform the master UE device 104a that it requires or would like assistance.

In some embodiments, the D2D coordinator 160 determines that the target UE device is to have assistance upon receiving a message from the network 106 in which the network 106 informs the D2D coordinator 160 that the target UE device has requested assistance or is to be assisted. For example, the centralized processing system 110 of the network 106 may make this determination and cause a message to be sent from the RRH 108a to the master UE 104a, which receives the message and forwards this to its D2D coordinator 160.

If the network 106 informs the D2D coordinator 160 that the target UE device requires assistance, then the network 106 must first make this determination. The following are example ways in which this may occur.

(a) The network 106 may receive a message from the target UE device indicating that the target UE device needs or would like assistance.

(b) The network 106 may obtain an indication of a wireless channel quality between the target UE device and the RRH 108a, and based on this indication (e.g. the wireless channel quality being below a particular threshold), the network 106 may determine that the target UE device requires assistance. An indication of wireless channel quality, as used herein, may be one or more channel quality indicator (CQI) or channel state information (CSI) values, or the indication may be based on a received sounding signal, e.g., sent by the target UE device. As another example, the indication of wireless channel quality may be an error rate of information wirelessly communicated (e.g. between the target UE and the RRH 108a). Examples of error rate include packet error rate, bit error rate, and frame error rate.

(c) The network 106 may obtain a buffer status indicating how many packets are to be transmitted from or received by the target UE, and based on this buffer status (e.g. a buffer status showing a queue of packets above a certain threshold), the network 106 may determine that the target UE device requires and/or is to have assistance.

The network 106 may perform a combination of some or all of (a) to (c) above.

In another embodiment, the D2D coordinator 160 determines that the target UE device is to have assistance without receiving an explicit indication from the network 106 or the target UE device in this regard. Example ways in which the D2D coordinator 160 can do this are as follows.

(i) The D2D coordinator 160 may determine that the target UE device is to have assistance based on an indication that the wireless channel quality between the target UE device and the RRH 108a is low (below a predetermined threshold). The indication of wireless channel quality may be received from the target UE device via D2D communication, or from the network 106. Alternatively, if the target UE device is the master UE device 104a (i.e. it is the master UE 104a device that is to have assistance), then the D2D coordinator 160 may obtain the wireless channel quality indication directly from the master UE 104a device itself (e.g. via another module in the master UE 104a device).

(ii) The D2D coordinator 160 may determine that the target UE device is to have assistance based on a buffer status message or value indicative of how many packets are to be transmitted from or received by the target UE device. The buffer status information may be received from the target UE device (via D2D communication), from the network 106, or directly from the master UE device 104a itself.

A combination of (i) and (ii) above may be performed.

In some embodiments above, the target UE device determines that it requires or would like assistance with wireless communication between the target UE device and the RRH 108a, and ultimately the master UE device is informed of this. Example ways in which the target UE device can make the determination are as follows.

(1) A user of the target UE device may manually instruct the target UE device to request assistance, e.g. by the user instructing the target UE device through a user interface.

(2) The target UE device may receive a message from the network 106 or directly from another UE device indicating that the target UE device is to request assistance.

(3) The target UE device may determine that it requires assistance based on the quality of the wireless channel between the target UE device and the RRH 108a being below a particular threshold.

(4) The target UE device may determine that it requires assistance based on a buffer status showing a queue of packets above a certain threshold.

The target UE device could perform a combination of some or all of (1) to (4) above.

Various ways in which the D2D coordinator 160 determines that the target UE device is to have assistance are described above. As a simple example consistent with one of the ways described above, the UE device 104c may determine that it requires assistance due to a poor channel quality between the UE device 104c and the RRH 108a. The UE device 104c may then directly communicate with the master UE device 104a over a D2D communication link to inform the D2D coordinator 160 of the master UE device 104a. The D2D coordinator 160 may then determine that, because the UE device 104c has requested assistance, the UE device 104c is a target UE device that is to have assistance.

With reference again to FIG. 3, in step 304, the D2D coordinator 160 determines whether another UE device of the plurality of UE devices 104a-d, which will be referred to as the "helper UE device", is to assist the target UE with the wireless communication between the target UE device and the RRH 108a. The following are example ways in which the D2D coordinator 160 can make this determination.

(a) The D2D coordinator 160 may receive a message indicative of which one of the plurality of UE devices 104a-d has the highest quality D2D communication link with the target UE device, and the D2D coordinator 160 may then select as the helper UE device the one indicated as having the highest quality D2D link. This helper UE device is determined to be the UE device to assist the target UE device. The message indicative of which of the plurality of UE devices 104a-d has the highest quality D2D communication link could be received from the target UE device via a D2D communication. In such a case, the master UE device 104a could directly communicate with the target UE device via D2D communications to request such information. As another example, the message indicative of which of the plurality of UE devices 104a-d has the highest quality D2D communication link could be received from the network 106. This situation may occur if the target UE device previously provided such information to the network 106. As another example, if the master UE device 104a is the target UE device, then the D2D coordinator 160 could obtain the information directly from the master UE 104a device itself. In an alternative embodiment, rather than the message being indicative of which one of the plurality of UE devices 104a-d has the highest quality D2D communication link with the target UE device, the message may instead be indicative of which one(s) of the plurality of UE devices 104a-d has/have an acceptably high channel quality of D2D communication link with the target UE device (e.g. the quality being higher than a predetermined threshold), in which case the D2D coordinator 160 may select as the helper UE device one of UE devices 104a-d indicated as having a D2D communication link of acceptably high quality.

(b) Assuming the helper UE device is different from the master UE device 104a, the D2D coordinator 160 may communicate directly with the helper UE device using D2D communication in order to enquire whether the helper UE device is able to assist the target UE device. The helper UE device can respond by providing an indication in this regard. The indication may be simply a "yes" or "no", or other information that allows the D2D coordinator 160 to determine whether the helper UE device is to assist the target UE device. Examples of such other information include the quality of the wireless channel between the helper UE device and the network, and/or the quality of the D2D communication link between the helper UE device and the target UE device, and/or the battery power of the helper UE device, and/or the processing capabilities of the helper UE device, and/or whether the helper UE device is connected to an external power source, and/or whether the helper UE device can provide a minimum level of security for handling packets of other devices. In some embodiments, the helper UE device may ask permission from its user (e.g. via a user interface), and only indicate that it can assist the target UE device if the user provides permission.

(c) The D2D coordinator 160 may determine that the helper UE device is to assist the target UE device based on a wireless channel quality between the helper UE device and the RRH 108a being above a predetermined threshold determined by the D2D coordinator 160. The indication of wireless channel quality may be received from the helper UE device via D2D communication, or from the network 106, or directly from the master UE device 104a itself (e.g. if the helper UE device is the master UE device).

(d) The D2D coordinator 160 may determine that the helper UE device is to assist the target UE device based on a power availability of the helper UE device being above a minimum threshold determined by the D2D coordinator 160. The indication of power availability may be received from the helper UE device, the network 106, or directly from the master UE device 104a. Power availability can include the amount of battery power the helper UE device has and/or whether the helper UE device is connected to an external power source.

(e) The D2D coordinator 160 may determine that the helper UE device is to assist the target UE device based on one or more specific capabilities of the helper UE device, such as: a level of processing power available to the helper UE device, and/or a level of storage capacity available to the helper UE device, and/or a level of security possessed by the helper UE device for handling packets of other UE devices (e.g. a helper UE device may, in some embodiments, need to be certified by the network to perform certain tasks requiring privacy and security protection), and/or whether the helper UE device has a predetermined minimum level of baseband and/or RF communication abilities, etc. In some embodiments, the helper UE device may be required to possess a minimum level of wireless communication capability (e.g. particular RF front end capabilities, such as a minimum number and/or quality of antennas, a minimum number and/or quality of low-noise amplifiers, a minimum quality of the RF communication circuitry and/or filtering, etc.). The D2D coordinator 160 may determine that the helper UE device is to assist based on or more of these specific capabilities being present and/or being above a minimum threshold determined by the D2D device coordinator 160. As above, the indication may be received from the helper UE device, the network 106, or directly from the master UE device 104a.

(f) The D2D coordinator 160 may receive from the network 106 a message identifying the helper UE device. The network 106 may determine the helper UE device using any, some, or all of the factors discussed in (a) to (e) in the five paragraphs above.

The D2D coordinator 160 could perform a combination of some or all of (a) to (f) described in the six paragraphs above.

With reference again to FIG. 3, in step 306, where the D2D coordinator 160 determines that the helper UE device is to assist the target UE device, then the D2D coordinator 160 instructs the helper UE device to use D2D communications to directly communicate with the target UE device to assist the target UE device with the wireless communication between the target UE device and the RRH 108a.

Assuming the helper UE device is different from the master UE device 104a, the D2D coordinator 160 may have the master UE device 104a directly communicate with the helper UE device using D2D communications to instruct the helper UE device. Alternatively, the master UE device 104a may communicate with the network 106 to inform the network 106 that the helper UE device is to assist, and the network 106 can then instruct the helper UE device (or relay the message from the master UE device 104a). In any case, it is the D2D participator in the helper UE device that receives the instructions and causes the helper UE device to assist the target UE device. If the master UE device 104a is the helper UE device, then the D2D coordinator 160 may directly instruct the D2D participator 161 of the master UE device 104a.

The D2D coordinator 160 also instructs the target UE device to use the D2D communications to directly communicate with the helper UE device to be assisted with wireless communication between the target UE device and the RRH 108a. This instruction may be transmitted to the target UE device directly, through the network, or relayed through the helper UE device.

Figure 4:
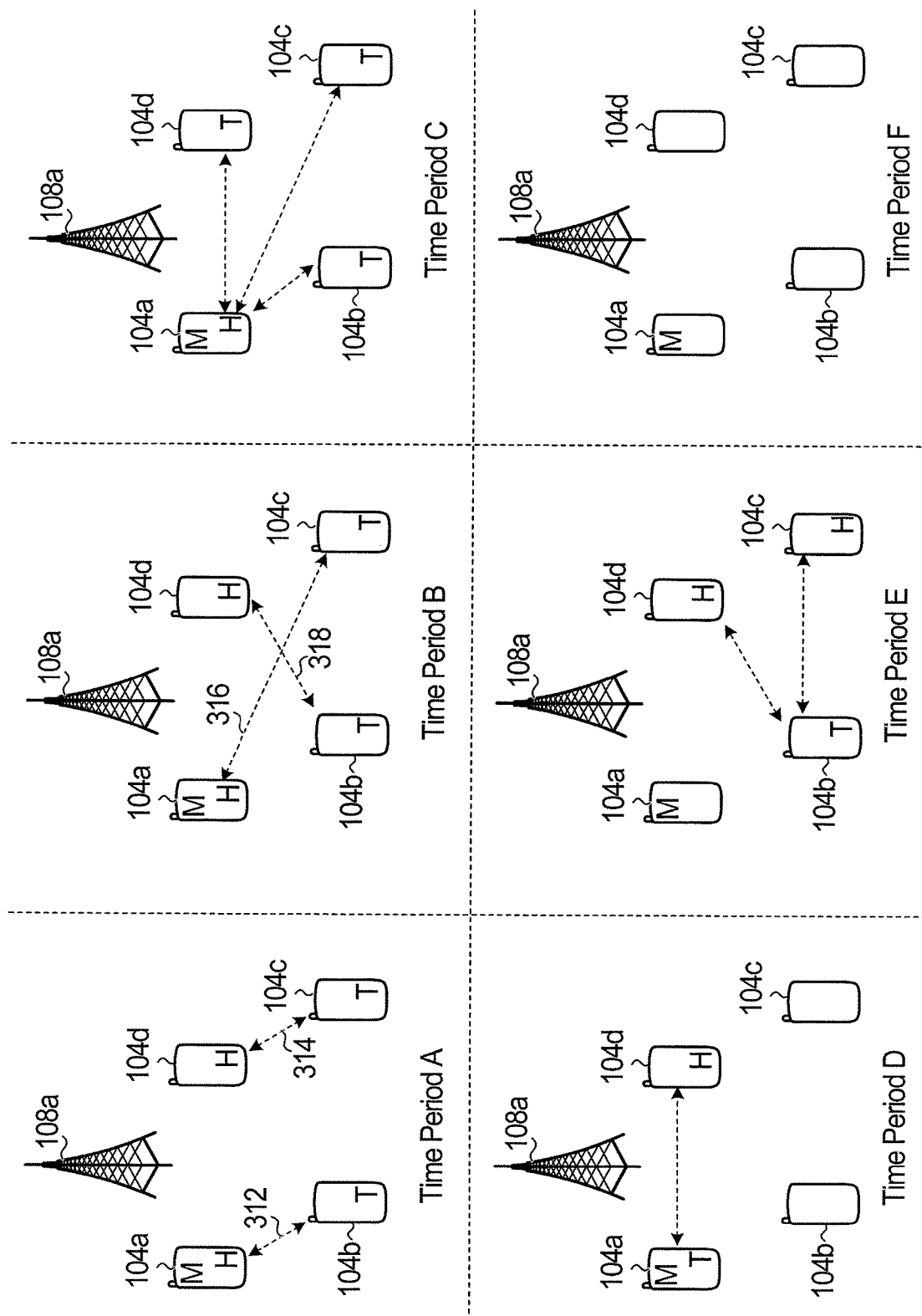
FIG. 4 shows an example of different target/helper UE device combinations in accordance with one embodiment.

Examples of Establishing and Re-Evaluating Target/Helper UE Device Configurations:

In some embodiments, the D2D coordinator 160 may set up several target UE device/helper UE device combinations/configurations, some examples of which are shown in FIG. 4. Although multiple different configurations are shown in sequence (A to F) in FIG. 4, it is contemplated that a D2D group may assume only one or more of these configurations in any sequence and for different durations, or may assume other configurations not shown.

During time period A, the D2D coordinator 160 has determined that UE devices 104b and 104c are target UE devices, that master UE device 104a is to be a helper UE device that will assist target UE device 104b, and that UE device 104d is to be a helper UE device that will assist target UE device 104c.

The D2D coordinator 160 may select this specific target/helper configuration using any of the methods described above. As an example, the D2D coordinator 160 may receive information (received at the master UE 104a) indicating that the wireless channel quality between UE device 104b and the RRH 108a is low (e.g. below a predetermined threshold), and indicating that the wireless channel quality between UE device 104c and the RRH 108a is also low, such that the UE devices 104b and 104c are determined to be target UE devices that are to be assisted. The D2D coordinator 160 may receive further information indicating that the UE device 104d has a wireless channel quality between the UE device 104d and the RRH 108a that is high (e.g. above a predetermined threshold), and that the UE device 104c has a D2D communication link with the UE device 104d of acceptably high quality (above a predetermined threshold), such that the UE device 104d is determined to be a helper UE that is to assist target UE device 104c. Similarly, the D2D coordinator 160 may receive further information indicating that the master UE device 104a has a wireless channel quality between the master UE device 104a and the RRH 108a that is also high, and that the UE device 104b has a D2D communication link with the master UE device 104a of acceptably high quality, such that the master UE device 104a is determined to be a helper UE that is to assist target UE device 104b.

After a period of time has elapsed, the D2D coordinator 160 may re-evaluate to determine if any target/helper configurations are to be modified. The period of time may be 1-2 seconds, although it could be shorter (e.g. 50 ms), or longer (e.g. more than 5 seconds). In some embodiments, the period of time may be under the control of the D2D coordinator 160 or under the control of the network 106. In some embodiments, the lapsing of the period of time could be determined based on a change in factors such as channel conditions, UE device locations, etc., and may be determined by the network and/or the master UE device 104a. The re-evaluation could also occur dynamically based on factors such as a change in channel quality (between particular UE devices and the base station and/or of certain D2D communication links) and/or a change in buffer status of one or more of the UE devices 104a-d.

During the re-evaluation, the D2D coordinator 160 determines whether the helper/target UE device configurations need to be modified. This may be based on updated information relating to the determination of which devices require assistance and which devices are in the best position to provide that assistance. The factors discussed earlier with respect to steps 302 and 304 in FIG. 3 can be used for determining whether a UE device is to be (or remain) a target UE device and whether a UE device is to be (or remain) a helper UE device.

As an example, at the end of time period A, the D2D coordinator 160 may determine that UE devices 104b and 104c still require assistance with their wireless communications with the RRH 108a, but that UE device 104d is now to assist UE device 104b using D2D communications 318, and that UE device 104a is now to assist UE device 104c using D2D communications 316. This reconfiguration may be based on updated information indicating that the UE device 104d now has a better D2D connection with UE device 104*b* (i.e. a D2D communication link of higher channel quality), and that the UE device 104*a* now has a better D2D connection with the UE device 104*c*. The D2D coordinator 160 therefore has master UE device 104*a* communicate this reconfiguration information to the UE devices, either directly using D2D communication or through the network 106. The result is that shown in time period B.

At the end of each time period in FIG. 4, the master UE device 104*a* re-evaluates to determine whether the helper/target UE device configurations may be modified or terminated. Various other example helper/target UE device configurations are illustrated in FIG. 4. In time period C, the master UE device 104*a* is a helper UE device and assists with the wireless communications between the RRH 108*a* and each of the target UE devices 104*b*, 104*c*, and 104*d*. For example, if the D2D coordinator 160 determined that that master UE device 104*a* had a good network connection to the RRH 108*a*, as well as a good D2D connection to UE devices 104*b*, 104*c*, and 104*d*, and the D2D coordinator 160 determined that the UE devices 104*b*, 104*c*, and 104*d* did not have a good (or as good of) a connection to the RRH 108*a*, then the helper/target UE device configuration shown in time period C may be appropriate.

During time period D, upon re-evaluation the D2D coordinator 160 determines that only master UE device 104*a* requires assistance and that UE device 104*d* is an appropriate helper, and so D2D coordinator 160 informs the UE devices of this and the only D2D communication is between UE device 104*d* and UE device 104*a*. During time period E, upon re-evaluation the D2D coordinator 160 determines that only UE device 104*b* requires assistance and that UE device 104*c* and UE device 104*d* are both appropriate helpers, and so D2D coordinator 160 informs the UE devices of this and the only D2D communications are between UE device 104*b* and UE device 104*c*, as well as between UE device 104*b* and UE device 104*d*. During time period F, upon re-evaluation the D2D coordinator 160 determines that none of the UE devices 104*a-d* requires assistance with wirelessly communicating with the RRH 108*a*, and so the D2D coordinator 160 informs the UE devices of this and no D2D communications are utilized.

By having a master UE device 104*a* determine target UE devices and corresponding helper UE devices and possibly re-evaluating the target/helper UE device configurations over time, there may be assurances that the UE devices in a D2D group are provided with, and benefit from, assistance with their wireless communications with the base stations, as needed, through D2D communications. This may be beneficial compared to ad hoc D2D communications between UE devices 104*a-d* without any D2D coordination, in which certain of UE devices 104*a-d* may not be able to secure assistance from the other members in the D2D group (or may secure assistance from another D2D member who is not in a good position to assist them).

In the embodiments described above, re-evaluation of the target/helper UE device configurations is performed periodically after a particular period of time has elapsed, or on a dynamic basis. However, it may instead be the case that certain helper/target UE configurations are static (i.e. set up and then not changed for an extended period of time). Also, it may be the case that the master UE device determines which UE devices are to assist each other, but lets the UE devices themselves decide who will be the helper(s) and target(s). In some of such embodiments, the UE devices may change which one is the helper and which one is the target on their own accord or at the instruction of the master UE device. In some embodiments, the target and helper UE devices, once chosen by the master UE device, may themselves have to control/coordinate use of the wireless channel for their D2D communications.

In the embodiments described above, a helper UE device is always assisting with wireless communication between the target UE device and base station. This needs not necessarily be the case. A helper UE device may instead (or also) assist with a D2D communication between the target UE device and another UE device. More generally, a helper UE device may simply be a UE device that sends information to or receives information from a target UE device using a D2D communication link (e.g. data sharing). In such embodiments, the master UE device may still determine the helper/target UE device configurations.

Examples of a Master UE Device Controlling Wireless Channel Access for D2D Communications:

In some embodiments, a D2D communication between first and second UE devices may be coordinated by controlling use of the wireless channel in order to mitigate interference with a D2D communication of at least one other UE device during the D2D communication between the first and second UE devices.

Figure 5:
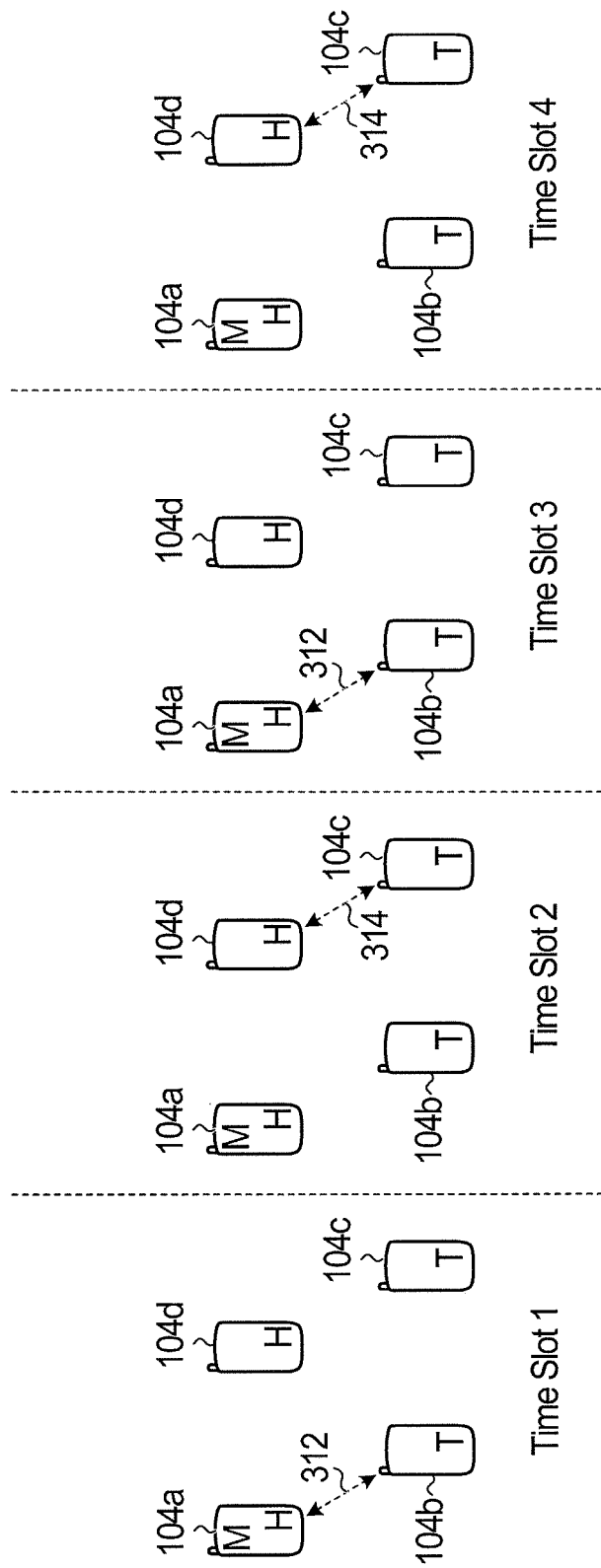
FIG. 5 shows an example of controlling use of the wireless channel for the D2D communications in accordance with one embodiment.

FIG. 5 shows an example of controlling use of the wireless channel for this purpose. FIG. 5 assumes that UE device 104*a* is a helper UE device that communicates with target UE device 104*b* using D2D communications 312, and UE device 104*d* is a helper UE device that communicates with target UE device 104*c* using D2D communications 314. However, to try to prevent or eliminate the D2D communications 312 from interfering with the D2D communications 314, the D2D coordinator 160 instructs the UE devices 104*a-d* to adhere to a time-division multiple access (TDMA) protocol in which the D2D coordinator 160 instructs the UE devices that during a first time slot D2D communications 312 may occur between UE devices 104*a* and 104*b*, but not between UE devices 104*c* and 104*d* (as shown at time slot 1 in FIG. 5), and during a second time slot D2D communications 314 may occur between UE devices 104*c* and 104*d*, but not between UE devices 104*a* and 104*b* (as shown at time slot 2 in FIG. 5). The time slots during which only D2D communications 312 are allowed, and the timeslots during which only D2D communications 314 are allowed can alternate, as shown in FIG. 5. It is the D2D participators (i.e. participators 161, 174, 186, and 200) of each of the UE devices 104*a-d* that receive the D2D wireless channel access instructions from the D2D coordinator 160 and ensure that their UE device adheres to the D2D channel access protocol as instructed by the D2D coordinator 160. The D2D coordinator 160 may instruct the UE devices 104*a-d* by sending one or more messages to the UE devices via D2D communication or via the network 106 (i.e. the network 106 sends or forwards the instruction to the UE devices).

TDMA is only one example of a channel access scheme/protocol that may be imposed by the D2D coordinator 160. Alternatively, the D2D coordinator 160 may impose a frequency-division multiple access (FDMA) channel access scheme in which each D2D communication link is assigned one or several frequency bands, or channels, that are sufficiently different from each other to try to mitigate interference. For example, one or more frequency channels may be assigned to UE devices 104*a* and 104*b* for their D2D communications 312, and a different one or more frequency channels may be assigned to UE devices 104*c* and 104*d* for their D2D communications 314. Alternatively, the D2D coordinator 160 may impose a code division multiple access (CDMA) channel access scheme in which different ones of the UE devices 104*a-d* use different CDMA codes to modulate their D2D communication signals. Alternatively, the D2D coordinator 160 may impose a space-division multiple access (SDMA) channel access scheme in which one or more of the UE devices 104a-d are assigned or use different radiation patterns for D2D communications. In some embodiments, there may be dedicated uplink or downlink resources assigned by the network 106 for D2D communications, and the D2D coordinator 160 may assign the UE devices 104a-d different one(s) of the dedicated resources for the D2D communications to try to mitigate interference between different D2D communications.

It will be appreciated that a combination of one or more of the example D2D channel access methods described in the paragraph above, and/or other D2D channel access methods, may be employed by the D2D coordinator 160. By having the D2D coordinator 160 coordinate/control wireless channel access, the sharing of the resource (channel access) may be simplified compared to an ad hoc method in which the UE devices 104a-d have to negotiate channel access.

Example Ways in Which Helper UE Device(s) may Assist with Wireless Communication Between a Network and Target UE Device(s):

As a first example, a helper UE device may decode and forward information to one or more target UE devices. For example, if a target UE device fails to correctly decode a packet received directly from the base station over a wireless channel because of noise or interference in the wireless channel between the target UE device and the base station, then the helper UE device may receive and decode the packet, and then forward the decoded packet (or its information) to the target UE device via a D2D communication link. The opposite operation may occur on the uplink. That is, a target UE device may forward packets destined for the base station to the helper UE device via the D2D communication link between the target UE device and the helper UE device, and then the helper UE device may transmit such packets (or information in the packets) to the base station over the wireless communication link between the base station and the helper UE device.

Figure 6:
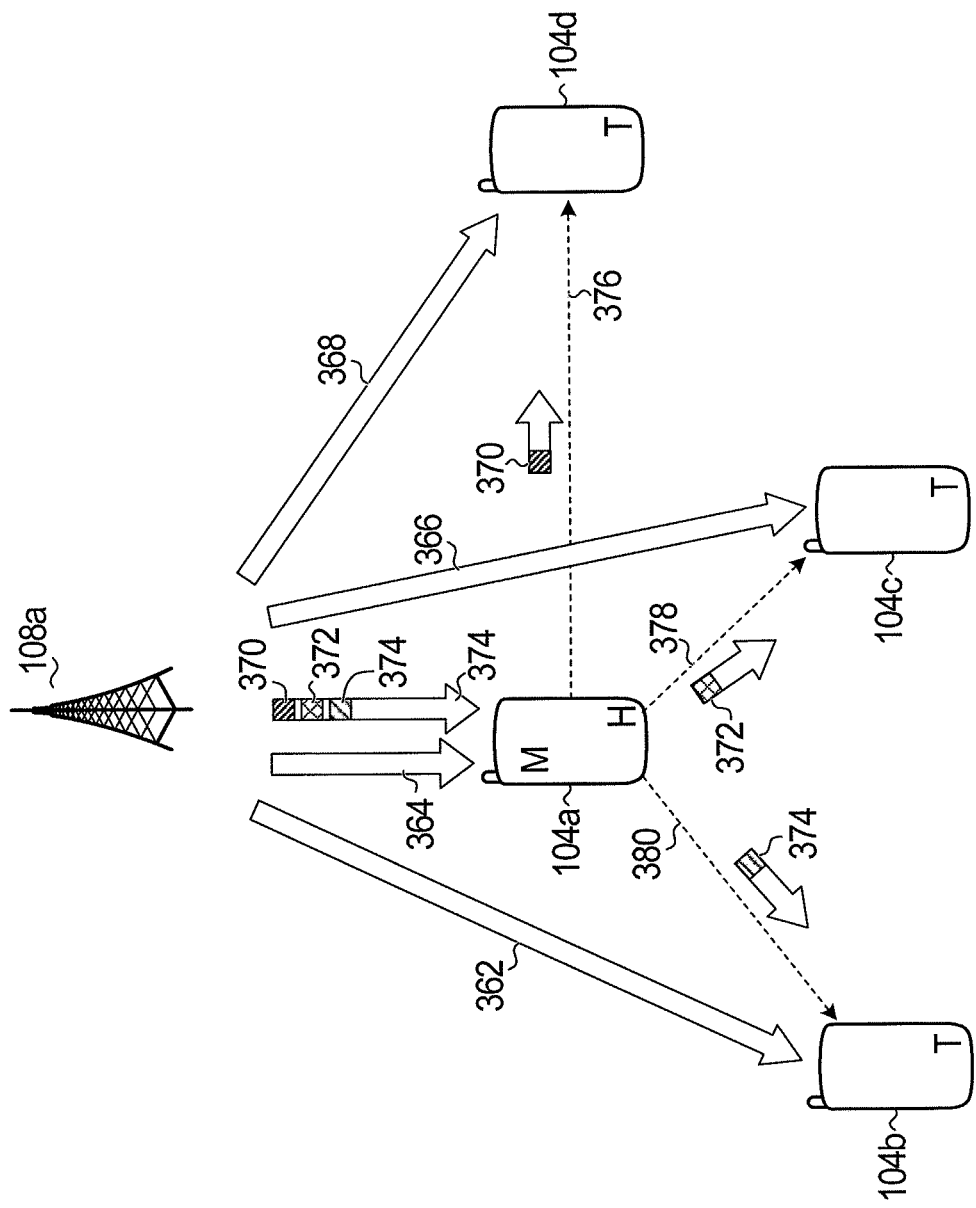
FIG. 6 shows an example of a "decode-and-forward" operation in accordance with one embodiment.

FIG. 6 shows an example of a "decode-and-forward" operation. FIG. 6 assumes the UE device 104a is the helper UE device, and UE devices 104b, 104c, and 104d are target UE devices. Control signals are sent from the RRH 108a directly to each of the UE devices 104a-d, but signals carrying data are sent from the RRH 108a only to the helper UE device 104a, and the helper UE device 104a decodes and forwards the data to each of the other UE devices 104b-d through D2D communication. Specifically, control signals 362 for the UE device 104b are transmitted from the RRH 108a to the UE device 104b directly over the wireless channel between the RRH 108a and the UE device 104b, as are control signals 364 for the UE device 104a, control signals 366 for the UE device 104c, and control signals 368 for the UE device 104d. The control signals may be broadcast signals or multicast signals or unicast signals specific to each UE device. With regard to the data packets, the RRH 108a wirelessly transmits to helper UE device 104a data packets 370, which are ultimately destined for UE device 104d, as well as data packets 372, which are ultimately destined for UE device 104c, and data packets 374, which are ultimately destined for UE device 104b. The helper UE device 104a then: (i) decodes and forwards data packets 370 to target UE device 104d over D2D communication link 376, (ii) decodes and forwards data packets 372 to target UE device 104c over D2D communication link 378, and (iii) decodes and forwards data packets 374 to target UE device 104b over D2D communication link 380. In FIG. 6, just the data packets are illustrated as being decoded and forwarded. It could instead be the case that some or all of the control signals are also or instead decoded and forwarded in a manner similar to the data packets 370, 372, and 374.

Figure 7:
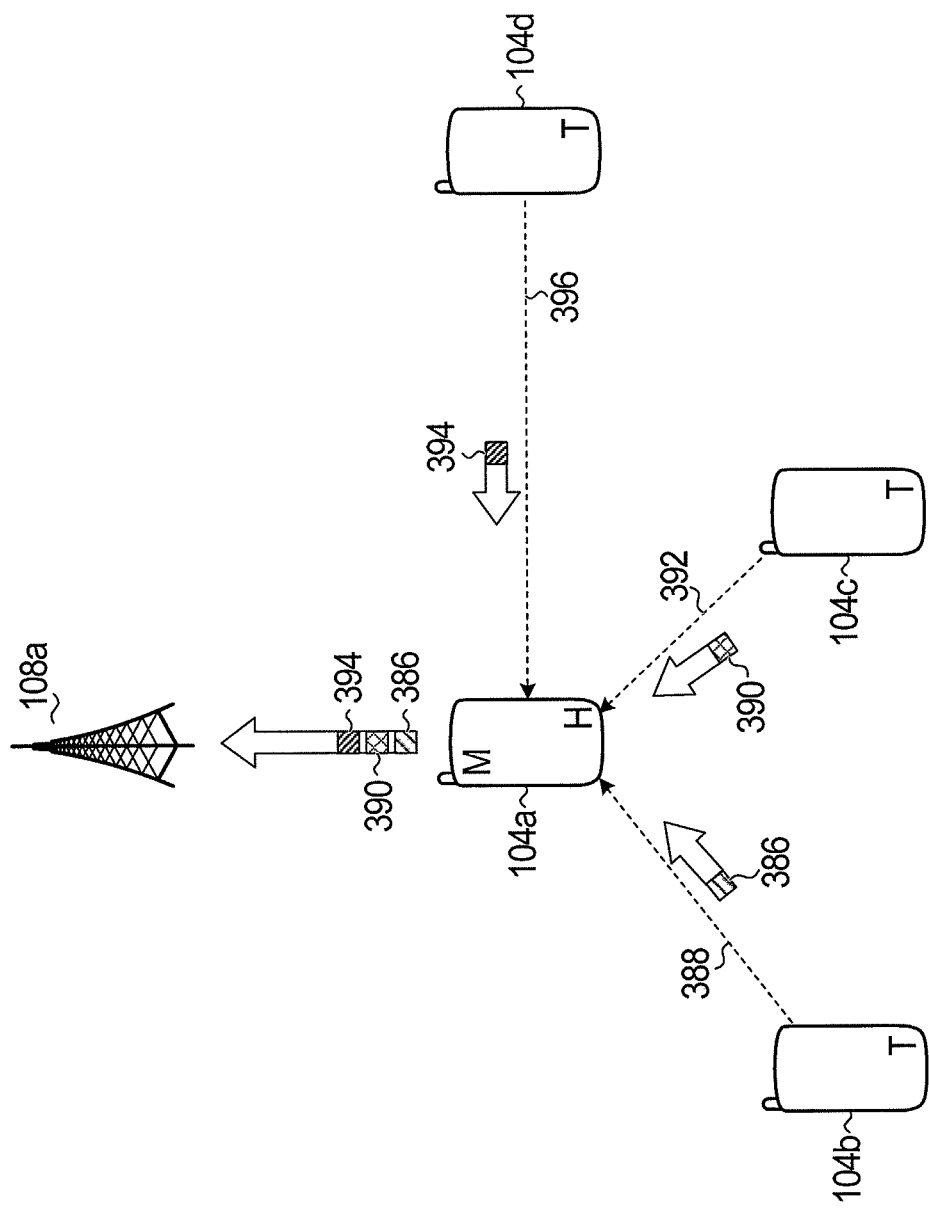
FIG. 7 shows an example of aggregating uplink signaling in accordance with one embodiment.

As another example, a helper UE device may collect all or some of uplink signaling from one or more target UE devices and forward such signaling to the network. FIG. 7 shows an example of aggregating uplink signaling in accordance with one embodiment. Uplink control signals 386 of target UE device 104b that are destined for RRH 108a are transmitted directly from target UE device 104b to helper UE device 104a over D2D communication link 388. Similarly, uplink control signals 390 of target UE device 104c that are destined for RRH 108a are transmitted directly from target UE device 104c to helper UE device 104a over D2D communication link 392. Similarly, uplink control signals 394 of target UE device 104d that are destined for RRH 108a are transmitted directly from target UE device 104d to helper UE device 104a over D2D communication link 396. The helper UE device 104a then aggregates such signals and directly wirelessly transmits them to RRH 108a. Examples of uplink signaling that may be aggregated in the manner shown in FIG. 7 include: acknowledgement (ACK) signals, and/or CQI signals, and/or random access channel (RACH) signals, and/or "keep-alive" signals.

Although the aggregation described in relation to FIG. 7 is with respect to uplink control signals, the aggregation may be performed on the downlink as well (or instead) for some downlink control signals. That is, control signals destined for some or all of the plurality of UE devices 104a-d may just be sent from the RRH 108a to helper UE device 104a, which then distributes them to the other UE devices 104b-d using D2D communication.

The aggregation described above may be particularly beneficial when the uplink signals from the target UE devices are not delay sensitive, as there may then not be as much of a concern with the delay associated with the helper UE device collecting such uplink signals through the D2D communications and aggregating them into one or several transmissions to the RRH 108a.

Another possible benefit of the aggregation is that it may free up some uplink resources (and therefore also possibly improve spectral efficiency) between the RRH 108a and the UE devices 104a-d. For example, if the D2D communications are out-of-band and do not utilize the RRH 108a uplink resources, and if several of such uplink signals can be aggregated and transmitted by the helper UE device 104a on the uplink using fewer resources, then this may save uplink resources compared to each target UE device using its own uplink resources to transmit its uplink control signals directly to the RRH 108a. This may result in a reduction in overhead associated with the signaling since each UE device 104a-d is not using uplink resources to transmit its control signals to the RRH 108a.

Another possible benefit of the aggregation is that it may lower the number of feedback signals sent to the RRH 108a. For example, the helper UE device may be able to send a single feedback signal that reports the feedback of multiple target UE devices. As an example, the helper UE device may be able to send a single CQI value and/or single CSI value for the collective channel. Specifically, one or more of the UE devices 104a-d may determine a CQI or CSI value defined based on the plurality of channels (between each device 104a-d and the RRH 108a) and their qualities when the devices 104a-d are helping each other. This may be referred to as the collective CQI, and it may be more stable, such that it may need to be updated less frequently. Also, since it is one feedback value for the whole D2D group, it may reduce the overhead per device. Therefore, in general, the feedback efficiency may increase as the number of target UE devices increase. In particular, there may be fewer feedback signals per UE device, or the feedback overhead may not grow (or not grow as fast) with the D2D group size compared to if each UE device were sending its own feedback signals directly to the access network. The master UE device may determine which one(s) of the UE devices is/are to compute the collective CQI and send it to the network, or the master UE device may itself compute the collective CQI and send it to the network.

With regard to the collective channel discussed above, a helper UE device that is stationary or that is nomadic, but does not move too often, may have a relatively stable channel due to lack of movement, and this may stabilize the collective channel, for example, if decode and forward operations are being performed in which information transmitted to/from the network and the members of the D2D group goes through the wireless communication link between the helper UE device and the base station.

Figure 8:
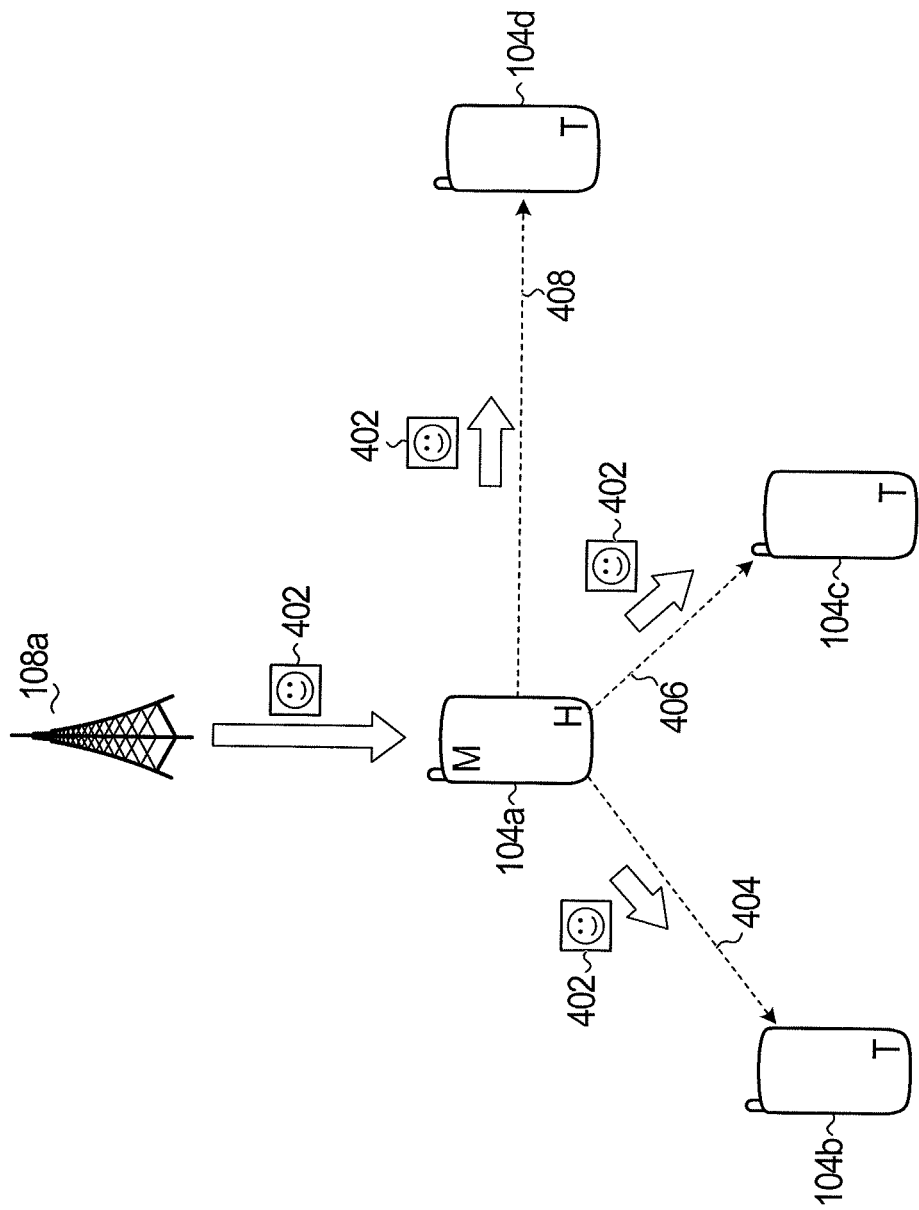
FIG. 8 shows an example of a UE device acting as a proxy for other UE devices in accordance with one embodiment.

As another example, a helper UE device may act as a proxy, receiving content directly from the base station and forwarding the content, via D2D communications, to any target UE devices that request the content and/or that are interested or are meant to receive the content. FIG. 8 shows an example of a UE device acting as a proxy for other UE devices. Content 402 is wirelessly transmitted from the RRH 108a to the helper UE device 104a via the wireless channel between the helper UE device 104a and the RRH 108a. The helper UE device 104a then queries to see which of the target UE devices 104b-d are interested in (or are to receive) the content 402, and directly transmits, using D2D communications, the content 402 to the appropriate target UE devices 104b-d. In FIG. 8 it is assumed that each one of target UE devices 104b-d are to receive the content 402, and so helper UE device 104a: (i) transmits the content 402 directly to target UE device 104b via D2D link 404, (ii) transmits the content 402 directly to target UE device 104c via D2D link 406, and (iii) transmits the content 402 directly to target UE device 104d via D2D link 408. The configuration in FIG. 8 is an example of how the master UE device can have a helper UE device assist in delivery of high demand content.

With respect to FIGS. 6 to 8, in some embodiments, the master UE device may choose the helper and target UE devices using the criteria discussed herein. The master UE device may instruct the helper UE device and/or target UE device specifically to perform the decode and forward, aggregation or proxy operation, or the target and helper UE devices may determine this themselves through direct D2D communication. Alternatively, the network may indicate that the decode and forward, aggregation or proxy operation is to be performed. In some embodiments, the master UE device may correspond with the network and/or the UE devices to set up the decode and forward, aggregation or proxy service. Also, although the master UE device 104a is illustrated as being the helper UE device in FIGS. 6 to 8, this needs not be the case. Another one of the UE devices 104b-d could instead be the helper UE device if it has suitable credentials.

In the examples described above with respect to FIGS. 6 to 8, the network 106 may consider the D2D group of UE devices 104a-d to be a single virtual user equipment device (VUE) with the master UE device (MUE) acting as the master of the VUE. The MUE may also be called a "VUE master node". The network 106 may associate the VUE with a single identification (ID) administered by the MUE or a helper UE device (e.g. if the MUE is not a helper UE device), and when certain information is transmitted between the RRH 108a and members of the VUE, the information is only transmitted between the MUE (or helper UE device) and the RRH 108a, and that information is distributed to/collected from other VUE members via D2D communications.

The master UE device may also set up or establish the VUE. For example, the master UE device may acquire the VUE ID and announce it to the members of the D2D group (e.g. using D2D communication), and/or the master UE device may incorporate UE devices into the VUE. In embodiments in which the network can assign some resources (e.g. time or frequency) to the VUE, the master UE device may acquire those resources from the network. The master UE device may also set up a resource sharing mechanism between UE devices in the VUE (i.e. control use of the wireless channel for the D2D communications amongst the UE devices in the VUE, as discussed above in relation to FIG. 5).

Another example way in which a helper UE device may assist one or more target UE devices is as follows. Both the helper UE device and a target UE device may receive a signal transmitted from the RRH 108a that carries one or more packets destined for the target UE device. The helper UE device may then transmit to the target UE device, via D2D communications, the signal as received by the helper UE device. The target UE device may then use this additional information to decode the packets carried by the signal. Effectively, it may be as if the target UE device and helper UE device were one device with multiple antennas comprising the antenna(s) of the target UE device and the antenna(s) of the helper UE device. This effective increase in receive antennas may increase the chances that the packets are decoded correctly. This form of assistance can be referred to as a linear technique.

Another example way in which a helper UE device may assist one or more target UE devices is as follows. The helper UE device may be able to correctly decode a source of interference that is affecting both the helper UE device's wireless communications with the base station and the target UE device's wireless communications with the base station. The helper UE device can then forward information about the interference directly to the target UE device via D2D communication, and the target UE device may be able to partially or fully cancel the interference using the information received from the helper UE device. This form of assistance can be referred to as a non-linear technique.

In the linear and non-linear techniques described above, the master UE device may choose the helper and target UE devices. Also, the master UE device may instruct the helper UE device specifically to perform this form of assistance (and the target UE device to be assisted in this way), or the target and helper UE devices may determine this themselves through direct D2D communication. In other embodiments, the network may indicate that this form of assistance is to be performed.

Another example way in which a helper UE device may assist one or more target UE devices is as follows. Normally, if not being assisted, each target UE device would need to wake up on a periodic basis to listen for paging messages from the network. Instead, the helper UE device could wake up more often or stay awake and listen for paging messages for the target UE devices it is assisting. Then, when a paging message destined for a target UE device is received, the helper UE device could wake up the target UE device using D2D communication, and/or forward the paging message using D2D communication. In this way, target UE devices may not need to wake up to listen for paging messages, but instead may receive them through D2D communication from the helper UE device. This may result in improved battery management. Also, in some embodiments, a single paging message may be sent to the helper UE device that indicates which UE devices in the D2D group are being paged. This "group paging" message may be sent on a periodic basis, and the periodic basis may be more frequent than other paging messages. The helper UE device can then wake up and/or forward paging messages to the appropriate target UE device(s). In this way overhead may be reduced due to the sending of a single paging message that pages multiple UE devices in the D2D group. Also, if the group paging message is sent more frequently than normal, this may result in a faster wakeup time for UE devices in the D2D group since there will be a shorter duration between when the network determines that a UE device is to be paged and when the group paging message (having the page in it) is sent. Also (or instead), the helper UE device, upon receiving the group paging message, may be able to wake up multiple target UE devices at the same time via the D2D communications, which may result in a faster wakeup time compared to sequentially paging and waking up each UE device being paged. It will be appreciated that the master UE device may choose the helper and target UE devices that participate in the group paging scheme, and the master UE device may correspond with the network and/or the UE devices to set up the group paging.

Another example way in which a helper UE device may assist one or more target UE devices is as follows. Normally, if a target UE device wants to obtain the attention of the base station to obtain an uplink resource assignment, it can use the RACH. This may involve delays, such as waiting for the opportunity to send a message on the RACH and/or colliding with other messages when transmitting on the RACH. However, with a helper UE device already awake and connected to the base station, rather than using RACH, the target UE device can transmit a message directly to the helper UE device using D2D communications, and the helper UE device can then communicate with the base station using its established connection to secure an uplink resource for the target UE device. This may result in faster resource assignment in the uplink for a target UE device.

Also, or alternatively, the target UE devices may send their buffer statuses to a helper UE device, rather than each target UE device individually and independently using a RACH to request uplink resources to send the data in their buffer. Then, the helper UE device can send a group buffer status update comprising the buffer status of each of the target devices. The helper UE device may send this on the RACH. Based on the group buffer status update, the network can dedicate the appropriate uplink resources for each of the target UE devices. This may replace or reduce RACH delay and/or result in higher layer overhead reduction.

The master UE device may instruct the helper UE device and/or the network to set up the group buffer status update. The master UE device may also choose the helper and target UE devices participating in the group buffer status update scheme and instruct them accordingly.

Another example way a helper UE device may assist one or more target UE devices is by reducing power consumption and/or battery drainage of the one or more target UE devices by acting as a relay between the one or more target UE devices and the base station so that, for at least some communications between a target UE device and the base station, the target UE device only has to transmit information to/receive information from the helper UE device through D2D communications. The helper UE device takes care of the transmission/reception of the information to/from the base station.

Another example way in which a helper UE device (and/or master UE device) may assist one or more target UE devices is by coordinating network coding amongst a plurality of UE devices in the D2D group.

A helper UE device may assist the network. For example, the network may be able to send to the helper UE device information for a target UE device that the network is not able to send to the target UE device directly because of a poor wireless channel. The helper UE device may then forward such information to the target UE device through a D2D communication link. As another example, the helper UE device assisting the target UE devices with their wireless communications with the base station may cause the collective channel of the D2D group to be more stable in time and/or frequency (i.e. vary more slowly), which may result in a physical layer signaling overhead reduction, for example, by not needing to send updated CQI and/or CSI values as often. The group paging and group buffer status updates described earlier may also reduce network overhead. Thus, a master UE device may coordinate a helper UE device in a way to result increased network performance and/or efficiency.

The establishment of a master UE device may also help with the D2D discovery process. For example, once a master UE device is established, the network may then send a message to other UE devices (e.g. through unicast or multicast) in close physical proximity indicating that there is a master UE device in the area. This may then cause the UE devices to initiate a discovery process to discover the master UE device and/or join a D2D group. In some embodiments, this may be a simpler or faster discovery protocol and/or may result in a smoother D2D group (or VUE) setup compared to having every D2D-enabled UE device periodically sending out discovery messages and/or listening for discovery messages in hopes that there may be a master UE device (or another D2D-enabled UE device or a D2D group) in close proximity. In some embodiments, the master UE device may also assist with network registration. For example, the master UE device itself (or another helper UE device chosen by the master UE device) may register the D2D group (or VUE) with the network. As another example, a UE device may have too weak of a network connection over the access channel to register with the network, but the UE device may be able to communication directly with the master UE device (or another helper UE device) using D2D communications, and the master UE device (or the another helper UE device) may register the UE device with the network. More generally, the master UE device may take responsibility for the signaling and planning responsible for network registration (i.e. network registration of a D2D group, VUE, or a particular UE device).

The establishment of a master UE device may also assist with two-tier hybrid automatic repeat request (HARQ) and/or acknowledgement (ACK)/negative-acknowledge (NACK), as follows. The HARQ and/or ACK/NACK signaling may be two tiered in that the plurality of UE devices forming the D2D group may first determine if any one of them is able to successfully decode a message sent from the base station. If none are, then a single NACK may be sent to the base station. Otherwise, if one or more UE devices are able to successfully decode the message, then any NACK is resolved within the D2D group using D2D communications. For example, if a message from the network is meant for a target UE device in the D2D group, and that target UE device is unable to successfully decode the message, but a helper UE device is, then rather than the target UE device automatically sending a NACK to the base station, the target UE device first waits to see if a helper UE device has decoded the message and can send it to the target UE device through D2D communications. As another example, if the message from the base station is meant for several target UE devices served by a helper UE device, as long as one of them correctly decodes the message, it may then be transmitted to the others through D2D communication. The master UE device may assist in administering the two-tier process. For example, the master UE device may set up the two-tier process and/or determine the target and helper UE devices. As another example, any target UE device that did not correctly receive a packet may send their NACK to the master UE device, which may then determine whether the packet was correctly decoded by any other UE device in the D2D group and, if so, have the correctly decoded packet sent to the target UE device over a D2D communication link. If the master UE device cannot resolve the NACK within the D2D group, it may forward the NACK to the base station. The master UE device may control the timing of a two tier HARQ timer and/or set up or coordinate a higher tier acknowledgement signaling node in the D2D group to try to mitigate conflict in sending two-tier messages.

In view of the many examples above, more generally it will be appreciated that the assistance may be coordinated by having communications between the base station and the target UE device relayed through the helper UE device, where the communication is transmitted between the target and helper using D2D communication, and the communication is transmitted between the helper and the base station using an access communication over an access channel. The master UE device can instruct the target and helper to set up this assistance. As an example, the D2D coordinator may transmit an instruction to the target UE device to instruct the target UE device to send data to the helper UE device (via D2D communication), to be relayed to the base station, or the target UE device may be instructed to use the D2D communication to receive data from the base station that has been relayed through the helper UE device. As another example, the D2D coordinator may instruct a helper UE device to receive a plurality of information, the plurality of information including a portion of information that either is received by the helper from a target UE device using D2D communication between the helper and target and is to be transmitted by the helper to the network, or is received by the helper from the network and is to be transmitted from the helper to the target using the D2D communication between the helper and target. For example, the "information" could be control signals being aggregated, as in FIG. 7, or a decode-and-forward of several packets, as in FIG. 6 (e.g. the "plurality of information" could be packets 370, 372, and 374 in FIG. 6, and the "portion of information" could be packet 370, which is forwarded from helper 104a to target 104d). As another example, the "portion of information" could be a buffer status of one particular UE device, and the "plurality of information" could be the group buffer status update. As another example, the "plurality of information" could be a paging signal indicating which D2D devices being paged, and the "portion of information" could be the indication in the paging signal that a particular UE device is being paged. It will also be appreciated that the network may be aware of the status of one, some or all of the UE devices in a D2D group (e.g. who is a helper, a target, a master UE), as well as which particular UE devices have a willingness to help the network (e.g. receive a group paging signal so that paging overhead may be reduced in the manner explained earlier). The network may use this status information to work with a master UE device and/or helper UE device(s) to assist in wireless communication between the network and the D2D group. For example, signalling and communication may be performed through a helper UE device (e.g. as in the FIG. 7).

Example Ways in which a Master UE Device May be Selected and Established:

In one embodiment, the network 106 may select the master UE device 104a. This may occur in the central processing system 110 of the network 106, although it could instead occur within the RRH 108a itself, particularly if the plurality of UE devices 104a-d are all connected to the network 106 through the same RRH (which is the case in the illustrated embodiment). If a network selects the master UE device, it may inform the selected UE device that it is a master UE device by sending such a message to the UE device from a base station of the network.

The following are example ways in which the network 106 may determine that a master UE device is to be established.

(a) The network 106 may receive a message from one or more of the plurality of UE devices 104a-d (via RRH 108a), the message requesting that a master UE device be established. The message need not necessarily be an explicit request from the UE device that a master UE device be established, although it could be. Alternatively, it may be some form of "complaint" or report from the UE device indicating poor D2D communication performance (e.g. unacceptable or undesirable interference between D2D communications or unacceptable or undesirable helper/target configurations). Alternatively, a "message" per se may not be received by the network 106, but instead the network 106 may observe poor quality, inefficiency, and/or performance of one or more UE devices (e.g. an inefficiency of a direct communication between a UE device and the network due to a low quality communication link, high error rate, etc.), and determine based on this that the one or more UE devices could use assistance from a neighbouring UE device through D2D communications. On this basis, the network may determine that a master UE device is to be established so that the master UE device can coordinate and control this assistance.

(b) The network 106 may automatically determine that a master UE device is to be established when it is informed by one of the plurality of UE devices 104a-d that a D2D group has been established, or when the network 106 establishes the D2D group. In some embodiments, the network 106 may determine that a master UE device is to be established when the D2D group becomes bigger than a predetermined size (e.g. more than three UE devices).

(c) The network 106 may determine that a master UE device is to be established upon receiving a request from a UE device that it be a master UE device. For example, a user of the UE device may request through a user interface of the UE device that the UE device become a master, and the UE device may transmit this request to the network. The network 106 may automatically select as the master UE device the UE device that requests that it be a master UE device. Alternatively, even though the UE device may request that it be a master UE device, the network 106 may only select this UE device as a master UE device if the UE device meets a predetermined minimum amount of the criteria discussed later for selecting a master UE device.

(d) The network 106 may identify a candidate D2D group based on knowledge by the network 106 that a group of UE devices are in close physical proximity to each other. For example, each of the UE devices may transmit their global positioning system (GPS) information to the network 106, and the network 106 may compare such GPS information, and if the GPS information reveals that the UE devices are within a predetermined physical distance from each other (e.g. within 20 meters), then the network 106 may identify the UE devices as a candidate D2D group. As another example, the network 106 may perform network-based location by means of triangulation between base station towers to determine the physical location of UE devices. Upon identifying a candidate D2D group, the network 106 may automatically determine that a master UE device is to be established and select one of the UE devices as the master UE device.

The network 106 may perform a combination of some or all of (a) to (d) in the four paragraphs above in order to determine that a master UE device is to be established.

In other embodiments, one or more of the UE devices themselves may determine that a master UE device is to be established. The network 106 may instruct one or more of the UE devices to establish the master UE device. Alternatively, a UE device itself in a D2D group may decide that a master UE device needs to be established. This may be based on poor D2D communication performance. When the D2D group itself selects the master UE device, this may be done through a negotiation process between the UE devices in order to choose a master UE device amongst them that best (or acceptably) meets the master UE device selection criteria discussed later. One way the UE devices in the D2D group may communicate with each other to establish a master UE device is through the network 106, which may be beneficial if there is no way (or no efficient way) to coordinate the use of wireless channel access for the D2D communications (since there is not yet a master UE device). Another way the UE devices in the D2D group may communicate with each other to establish a master UE device is through direct D2D communications, such as through using contention based communication. As an example, the D2D group may communicate with each other using virtual full duplex two dimensional sparse code multiple access. An example of this is disclosed in the PCT patent application publication WO2014090204.

If a master UE device is to be selected, whether it be by the network 106, or by UE devices (e.g. UE devices 104*a-d* in a D2D group), the master UE device may be selected based on particular selection criteria, examples of which are listed below:

(a) It may be beneficial if the master UE device is stationary, or is nomadic but does not move too often or too fast. This is because a UE device that moves too often or too fast may soon leave the D2D group, causing there to no longer be a master UE device in the D2D group (and perhaps causing the selection process to begin all over again to select a new master UE device). Therefore, how stationary a candidate master UE device is may factor into the criterion or criteria for selecting the master UE device. For example, a candidate master UE device may not be selected if its physical location changes (or changes at an average rate more than a predetermined amount) over a predetermined period of time. There are different ways to determine whether or how often (or fast) a candidate master UE device is moving. For example, the candidate master UE device could have an accelerometer that provides data indicative of movement of the candidate master UE device. This data may be transmitted from the candidate master UE device to the entity evaluating the selection criteria (e.g. the network 106 or another UE device). Tracking the location of the candidate master UE device (e.g. using GPS) over time may also provide an indication of how often or fast the candidate master UE device is moving. How fast the wireless channel between the candidate master UE device and the network is changing may also (or instead) provide an indication of how often or fast the candidate master UE device is moving.

(b) It may be desirable that a user of the candidate master UE device either requests to be a master UE device or gives permission to be a master UE device (e.g. through a manual prompt via a user interface). The selection criterion or criteria may therefore incorporate this as a factor.

(c) It may be beneficial if the master UE device has adequate power availability (e.g. available battery power above a predetermined threshold or connection to an external power source). The selection criteria or criterion may therefore incorporate this as a factor.

(d) It may be beneficial if the master UE device has a quality of a communication link between the master UE device and the network that is above a predetermined quality threshold. The selection criteria or criterion may therefore include whether a candidate master UE device has such a network connection. For example, if this is not met, then a candidate master UE device may not be chosen as the master UE device.

(e) It may be beneficial if the channel properties of the communication link between the candidate master UE device and the network are not changing, or are changing at a rate that is less than a predetermined value over a given period of time. Therefore, the selection criteria or criterion may incorporate this as a factor.

(f) It may be beneficial if the master UE device has a D2D communication link with other UE device(s) in the D2D group that is above a minimum threshold of quality and/or that the master UE device has D2D communication links with other UE device(s) in the D2D group that have channel properties that do not change or change less than a predetermined amount over a predetermined period of time. Therefore, the selection criterion or criteria may factor this in (e.g. a candidate master UE device may not be selected as the master UE device if it has a D2D communication link with at least one other UE device in the D2D group that is below a predetermined minimum level of quality).

(g) The selection criterion or criteria may factor in the physical location of a candidate master UE device relative to the physical location of other UE devices in the D2D group. For example, a candidate master UE device may not be chosen as the master UE device if it is at a physical boundary location of the D2D group, as this may indicate that the candidate master UE device may soon be out of physical range or have poor quality D2D communication links with other D2D group UE devices on the other side of the physical space defining the D2D group. The physical location of the candidate master UE device may have to meet a minimum threshold of acceptability. In this way, the master UE device may be more strategically placed/located.

(h) Other selection criteria may include terminal capabilities of a candidate master UE device, such as whether the candidate master UE device has a predetermined level of security for handling packets belonging to others of the plurality of UE devices (e.g. a master UE device may need to be certified by the network to perform certain tasks requiring privacy and security protection), and/or whether the candidate master UE device has at least a predetermined minimum level of processing capabilities, and/or whether the candidate master UE device has at least a predetermined minimum level of storage capabilities, and/or whether the master UE device has at least a predetermined minimum level of wireless communication capabilities, such as baseband and/or RF front end capabilities (e.g. the number and/or quality of antennas, the number and/or quality of low-noise amplifiers, the quality of the RF communication circuitry and/or filtering, etc.).

Selection criteria may include one, some, or all of the example selection factors in (a) to (h) in the eight paragraphs above. If the network 106 is selecting the master UE device, then it may receive information from candidate master UE devices indicative of the selection criteria, and decide which candidate master UE device is to be the master UE device based on which of the candidate master UE devices best meets the selection criteria (or alternatively by choosing any one of the candidate master UE devices that acceptably fits within the selection criteria). Alternatively, if UE devices in a D2D group are to themselves negotiate a master UE device, a volunteer UE device in the D2D group may receive and compare such information and select as the master UE device the candidate master UE device that best meets (or acceptably fits) the selection criteria.

The selection criteria discussed above are examples of metrics used to determine the master UE device. The metrics could be network set/assigned or predefined. Selecting the master UE device may be based on a metric optimization.

The master UE device may be permanently selected, or alternatively it may be dynamically selected in that the selection may be re-evaluated (e.g. by the network or by one or more of the UE devices in the D2D group) on a periodic basis to determine whether the master UE device is still suitable. For example, if upon re-evaluation it is determined that the master UE device no longer has a good connection to the network, then it may have its master UE device status revoked. In such embodiments, a new selection process may begin to select a new master UE device. Also, in some embodiments, a new master UE device may only be selected on an "as-needed" basis when a current master UE device leaves the D2D group or loses its ability to adequately perform the functions of a master UE device (e.g. the master UE device loses its connection with the access network and/or loses its D2D connection(s) with one or more of the other UE devices in the D2D group and/or the master UE is leaving or has left the D2D group and/or a more capable, or potentially more capable, UE device has entered the D2D group). The master UE device status could also be temporarily delegated to another UE device.

In some embodiments, when it is determined that a new master UE device is to be selected, then assuming the current master UE device still has the ability to act as a master UE device, the new master UE device is selected before the current master UE device has its master UE device status revoked. This may allow for a seamless transition from one master UE device to another.

Example Network Operations:

The role of the network varies in different embodiments. In some embodiments, the network is not involved in any aspect of establishing the master UE device and D2D coordination. For example, one or more UE devices in a D2D group may determine that a master UE device is to be established, and the master UE device may be selected by one of the UE devices in the D2D group in the manner discussed above, and then that master UE device may coordinate the D2D communications without the network 106 knowing, or perhaps with the network 106 only being informed that this is happening as a courtesy or to have the master UE device network-sanctioned. On the other hand, the network 106 may control much of the process. For example, the network 106 may establish the D2D group and determine that a master UE device is to be established, may select the master UE device, and may inform the master UE device of the level of coordination that the master UE device is able to perform. The network may also select one or more helper and/or target UE devices. The master UE device may communicate to the network information such as the target/helper configurations and/or the performance or needs of the UE devices in the D2D group (e.g. the buffer status of the UE devices, the channel quality of the D2D communication links between the different D2D devices, etc.). Any involvement of the network between the two extremes of no network involvement and full network involvement is contemplated.

Figure 9:
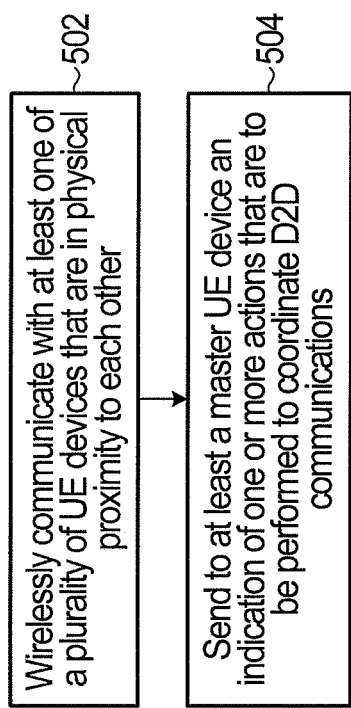
FIG. 9 shows an example of operations that may be performed by the network in accordance with one embodiment.

FIG. 9 shows an example of operations that may be performed by a network, e.g. network 106, in accordance with one embodiment.

In step 502, the network establishes a wireless connection and wirelessly communicates with at least one of a plurality of UE devices that are in physical proximity to each other, where at least two of the plurality of UE devices able to directly communicate with each other using D2D communication.

In step 504, the network sends to at least a master UE device of the plurality of UE devices an indication of one or more actions that are to be performed by the master UE device to coordinate D2D communications amongst the plurality of UE devices. For example, the message sent from the network may indicate that the master UE device is to select target UE devices and helper UE devices in the D2D group in the manner explained earlier. The message may indicate how often the master UE device is to re-evaluate the target/helper combinations. The message may indicate that the master UE device is to control use of the wireless channel for D2D communications between UE devices and indicate which type of channel access method should be used (e.g. TDMA). In any case, it will be appreciated that the message does not have to literally tell the master UE device which actions to perform. For example, it could be that any UE device selected as a master UE device is configured to perform one or more predetermined actions (e.g. select target and helper UE devices and control wireless channel access for the D2D communications). The message in such an embodiment may just be an indication that the master UE device is to now begin to perform such predetermined actions. In some of such embodiments, the message may be the same message (or part of the same message) that the network sends to the UE device to let the UE device know that the UE device has been established as the master UE device.

In some embodiments, the method performed by the network may include some or all of the following operations: determining that a master UE device is to be established and selecting one of a plurality of UE devices as a candidate master UE device; sending a first message to the candidate master UE device requesting that the candidate master UE device be the master UE device; receiving a response from the candidate master UE device indicating that the candidate master UE device is willing to be the master UE device; receiving a message from the master UE device indicating that D2D connections are established between the master UE device and other of the plurality of UE devices for the master UE device to coordinate the D2D communications amongst the plurality of UE devices; sending to the plurality of UE devices a command to begin taking instructions from the master UE device; sending to at least the master UE device an indication of one or more actions that are to be performed by the master UE device to coordinate the D2D communications.

In some embodiments, the method performed by the network may include some or all of the following operations: determining that a master UE device is to be established and sending a request to establish a master UE device, the request being sent to at least one of a plurality of UE devices; receiving from one or more of the plurality of UE devices an indication of one or more candidate master UE devices amongst the plurality of UE devices; for each of the one or more candidate master UE devices, determining whether the candidate master UE device is permitted to be the master UE device, and if the candidate master UE device is permitted to be the master UE device, then adding the candidate master UE device to a list of survived master UE device candidates; sending a request asking that the survived master UE device candidates negotiate to choose the master UE device, the request sent to at least one of the plurality of UE devices (the negotiating may include different survived master UE devices requesting to be a master UE device and one of them determining who is to be the master UE device based on which one best meets, or acceptably meets, the selection criteria discussed earlier); receiving a message from one of the survived master UE device candidates indicating that it is the master UE device.

Figure 10:
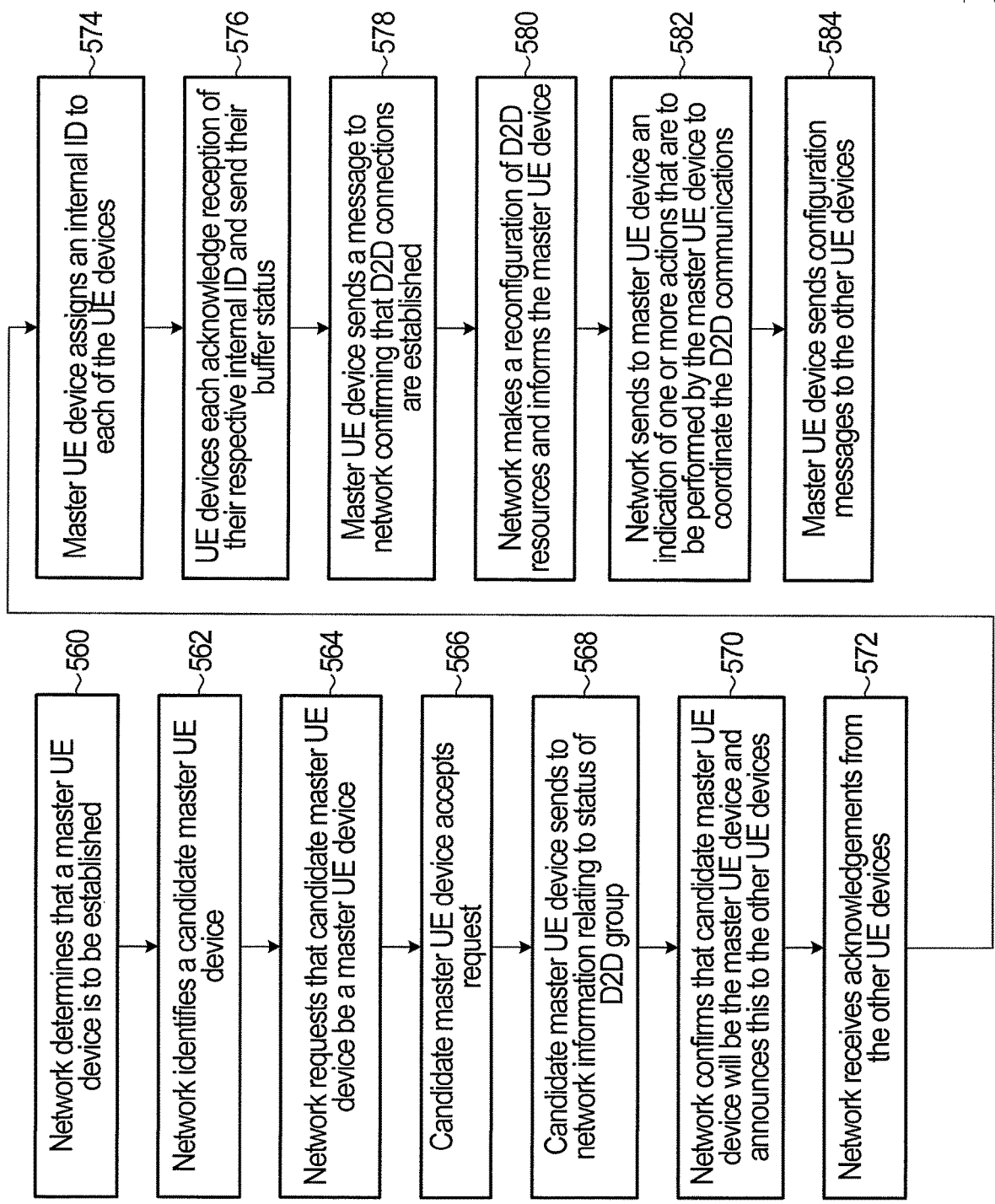
FIG. 10 shows an example method of establishing a master UE device in accordance with one embodiment.

In some embodiments, the method performed by the network may include some or all of the following operations: receiving a message from a particular UE of a plurality of UE devices, the message indicating that the particular UE is a master UE device; sending an acknowledgement to the master UE device; receiving from the master UE device an indication of D2D connections or channels and/or buffer statuses of the plurality of UE devices; sending to the master UE device an indication of one or more actions that are to be performed by the master UE device to coordinate the D2D communications amongst the plurality of UE devices. Three Specific Example Methods for Establishing the Master UE Device 104a:

FIG. 10 shows an example method of establishing the master UE device 104a in accordance with one embodiment.

In step 560, the network 106 determines that a master UE device is to be established, e.g. based on the need for a master UE device. Different ways in which the network 106 may make this determination are explained earlier. For the sake of example, the network 106 may determine that a master UE device is to be established based on an inefficiency of a direct communication between one of the plurality UE devices and the network 106.

In step 562, the network 106 identifies a proper candidate master UE device within the plurality of UE devices 104a-d. By "proper" candidate, it is meant a UE device that best meets or acceptably meets the master UE device selection criteria. Examples of master UE device selection criteria are discussed earlier. The proper master UE candidate may be UE device 104a.

In step 564, the network 106 sends to UE device 104a a message requesting that UE device 104a be a master UE device.

In step 566, the UE device 104a accepts the request and indicates this by transmitting a response to the network 106. In some embodiments, the UE device 104a may be able to decline the request to be a master UE device. This may be due to reasons such as the following: a user of the UE device 104a is asked for permission to be a master UE device and the user of the UE device 104a declines (e.g. through the user interface of the UE device 104a), and/or the UE device 104a declines based on not meeting selection criteria (or criterion) independently evaluated by the UE device 104a. For example, the UE device 104a may determine that it does not have (or no longer has) an acceptable quality connection to the network 106 and/or D2D connections with the other UE devices 104b-d of acceptable quality, and/or the UE device 104a may determine that it does not have (or no longer has) acceptable processing, storage, and/or power capabilities, etc., and/or that it includes suspicious software such as malware. In some embodiments, a user of the UE device 104b-d may also indicate through the user-interface that it is never acceptable to be a master UE device.

Assuming the UE device 104a accepts the request to be a master UE device, then in step 568 the UE device 104a sends to the network 106 information relating to the status of the D2D group. Such information may include the buffer status of some or all of the UE devices 104a-d (if the UE device 104a has such information), and/or the CSI of the D2D channels between the UE device 104a and the other UE devices 104b-d.

In step 570, the network 106 confirms that the UE device 104a will be the master UE device and announces this to the other UEs 104b-d.

In step 572, the network 106 receives messages from the other UE devices 104b-d indicating that they have acknowledged that the UE device 104a is to be the master UE device.

In step 574, the master UE device 104a assigns an internal identification (ID) to each of the plurality of UE devices 104a-d that are to have their D2D communications coordinated. The internal ID may be two bits long, with each bit permutation identifying one of the four UE devices 104a-d. Assigning an internal ID may save overhead compared to using the UE device's full ID. This is because the internal ID may be shorter since it only has to distinguish between the UE devices in the D2D group (i.e. UE devices 104a-d), not all UE devices served by the network 106. Also, although "internal" ID is used, this does not necessarily mean that it is only known to (or within) the D2D group. For example, the network may also know the internal IDs of some or all of the UE devices in the D2D group and may use the internal ID(s) to refer particular UE devices in the D2D group when communicating with the D2D group.

In step 576, the UE devices 104b-d each acknowledge reception of their respective ID and send their buffer status to the master UE device 104a.

In step 578, the master UE device 104a sends a message to the network 106 confirming that D2D connections are established between the master UE device 104a and other of the plurality of UE devices 104b-d. The master UE device 104a may also send to the network 106 the initial configurations between the plurality of the UE devices 104a-d (i.e. who is currently assisting whom through D2D communications). The master UE device 104a may also send to the network the buffer status of each of the plurality of UE devices 104a-d, if such information has not previously been provided to the network 106.

In step 580, the network 106 may make a reconfiguration of D2D resources between the master UE device 104a and the rest of the plurality of UE devices 104b-d and send an indication of this reconfiguration to the master UE device 104a. For example, the network 106 may review the quality of the D2D connections and the buffer status of each of the plurality of UE devices 104a-d and decide who is to be a target UE device and who is to be a helper UE device. The network 106 may use the criteria discussed earlier for determining target and helper UE devices.

In step 582, the network 106 may also finalize the level of cooperation of the master UE device 104a, i.e. send to the master UE device 104a an indication of one or more actions that are to be performed by the master UE device 104a to coordinate the D2D communications amongst the plurality of UE devices.

In step 584, the master UE device 104a sends the configuration messages to the plurality of other UE devices 104b-d via the D2D connections between the master UE device 104a and the plurality of UE devices 104b-d.

Figure 11:
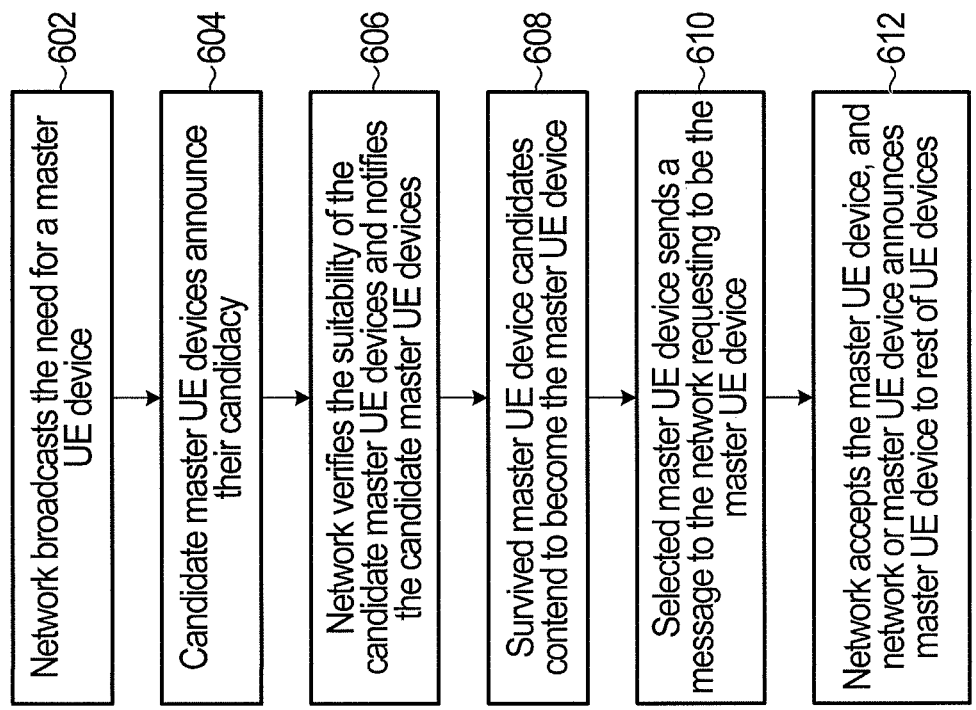
FIG. 11 shows an example method of establishing a master UE device in accordance with another embodiment.

FIG. 11 shows an example method of establishing the master UE device 104a in accordance with another embodiment.

In step 602, the network 106 broadcasts to the plurality of UE devices 104a-d a need for a master UE device.

In step 604, the "proper" UE devices of the plurality of UE devices 104a-d announce their candidacy to the network 106. By "proper" UE device it is meant the UE device acceptably meets master UE device selection criteria. These UE devices will be referred to as the "candidate master UE devices".

In step 606, the network 106 verifies the suitability of the candidate master UE devices and notifies the candidate master UE devices. Verifying the suitability of the candidate master UE devices may comprise the network 106 independently confirming that the master UE device selection criteria discussed earlier are met or are still met for the candidate master UE devices. There could also be instances in which the network 106 does not want or allow a particular UE device to be a master UE device, and if so, this would be checked against the candidate master UE devices. The notified candidate master UE devices will be referred to as the "survived master UE device candidates".

In step 608, the survived master UE device candidates then contend to become the master UE device. For example, one of the survived master UE device candidates, or another one of the plurality of UEs 104a-d, may collect the information from the survived master UE device candidates relating to the selection criteria (e.g. information that may include factors such as quality of access to the network 106, quality of D2D communication links, power availability, processing power, etc.), and the volunteer may then select as the master UE device the survived master UE device candidate that best meets (or one that acceptably meets) the selection criteria.

In step 610, the one selected as the master UE device (i.e. UE device 104a in FIG. 1) sends a message to the network 106 requesting to be the master UE device.

In step 612, the network 106 accepts the master UE device 104a, and then the network 106 (through unicast or multicast from the RRH 108a) or the master UE device 104a (through D2D communication) then announces to the rest of the plurality of UE devices 104b-d in the D2D group that UE device 104a is the master UE device.

Figure 12:
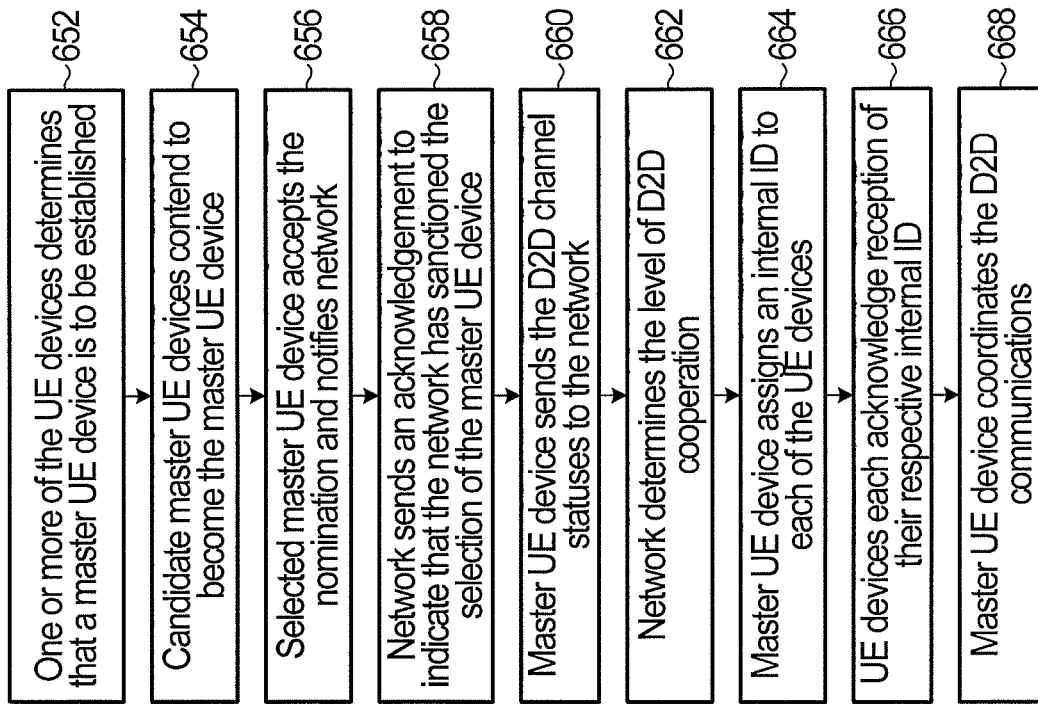
FIG. 12 shows an example method of establishing a master UE device in accordance with another embodiment.

FIG. 12 shows an example method of establishing the master UE device 104a in accordance with another embodiment.

In step 652, one or more of the plurality of UE devices 104a-d determine that a master UE device is to be established.

In step 654, candidate master UE devices contend to become the master UE device, which may occur in a manner similar to (or the same as) step 608 in FIG. 11.

In step 656, the selected master UE device (which is UE device 104a in the FIG. 1 example) accepts the nomination and sends a message to the network 106 indicating that it is a master UE device.

In step 658, the network 106 sends an acknowledgement, which indicates that the network 106 has sanctioned the selection of the master UE device.

In step 660, the master UE device sends the D2D channel statutes (e.g. the level of quality of the D2D communication links between the plurality of UE devices 104a-d, as well as the buffer status of each of the UE devices 104a-d) to the network 106.

In step 662, the network 106 determines the level of D2D cooperation that the master UE device is to coordinate by delegating or appointing some such functions to the master UE device. This may be done by the network 106 sending to at least the master UE device an indication of one or more actions that are to be performed by the master UE device to coordinate the D2D communications amongst the plurality of UE devices (e.g. whether the master UE device is to select target UE devices and helper UE devices in the D2D group and/or whether the master UE device is to control wireless channel access for D2D communications between UE devices, and if so then how).

In step 664, the master UE device assigns an internal ID to each of the plurality of UE devices 104a-d that are to have their D2D communications coordinated.

In step 666, the UE devices 104b-d each acknowledge reception of their respective internal ID.

In step 668, the master UE device may then coordinate the D2D communications amongst the plurality of UE devices 104a-d. In some embodiments, the master UE device may keep the network 106 updated (e.g. as to target/helper configurations, for example), on a periodic or need-to-know basis.

Other Variations and Alternative Embodiments

In the illustrated embodiments, it has been assumed that the UE devices communicate wirelessly (both with a base station and directly with each other using D2D communication). However, it could be the case that one or more of the UE devices has a wireline connection back to the access network. For example, the master UE device may have a wireline connection to the access network via Ethernet. It could also be the case that some or all of the D2D connections between the UE devices are wireline rather than wireless.

Also, it should not be assumed that the UE devices 104a-d are all necessarily user operated. It could be the case that one of the UE devices 104a-d is a "dummy" UE device, which is a UE device that does not belong to a particular user (i.e. customer), but instead to the network. The purpose of such a dummy UE device may be to be located by the network in coverage areas of interest and act as a helper UE device through D2D communications. For example, a dummy UE device may be placed in a crowded location at an event and be designated as the master UE device by the network. Other "regular" UE devices (i.e. customers of the network) could join a D2D group coordinated by the master (dummy) UE device, and by doing so become target UE devices that the master (dummy) UE device would assist using D2D communications. The master (dummy) UE device could also designate other UE devices in the D2D group as helpers, if desired. However, a potential benefit of having the dummy UE device as the helper and master UE device is that it may be under the complete control of the network and so may be provisioned with suitable security settings, power availability, processing capability, wireless communication capability (e.g. good RF front end), etc., and may be placed at a particular location with good access to the access network, e.g. via a wireline connection, or wirelessly via a clear line of sight to the base station. In some embodiments, the dummy UE device may be a permanent master UE device (and/or permanent helper UE device) in the D2D group.

In the embodiments above, certain operations are described as being performed by a D2D coordinator and a D2D participator. More generally, it will be understood that such operations are ultimately operations performed by the UE devices themselves. For example, when it is described that the D2D coordinator 160 in FIG. 2 coordinates wireless channel access for the D2D communications, it will be appreciated that it is the master UE device under the instruction of the D2D coordinator that ultimately performs such an operation.

With regard to the D2D coordinator mentioned above, as described earlier it may be implemented by a processor that executes instructions stored in memory. Such instructions may be provided by the network upon the UE device becoming designated a master UE device. In other embodiments, the D2D coordinator instructions may be stored in the UE device upon manufacture, or downloaded at a later date, but only become operational or activated upon the UE device being designated a master UE device. The same applies to the D2D participator.

In the embodiments above, some operations are performed by the access network. More generally, such operations performed on the network side may be performed by one or more network components. For example, if the network selects a master UE device, this may be done by one or more servers in the access network (e.g. in centralized processing system 110), with the message communication with the UE devices involving one or more base stations. In some embodiments, all of the operations performed by the network relating to the establishing the master UE device and/or D2D coordination may be performed at the base station (e.g. in RRH 108a). However, a possible benefit of having most of the access network operations occur in one or more centralized processing systems, rather than at individual base stations is that then the base stations may not each need to individually have the ability to perform the operations. This means that the base stations may be less sophisticated (and therefore potentially less expensive), with intelligence centralized in the access network. Also, by having most of the access network operations occur in one or more centralized processing systems, it may be easier to form and/or interact with and/or coordinate or control a D2D group comprising UE devices that communicate with different base stations.

In some embodiments described above, the master UE device may coordinate D2D communication between at least two UE devices in a D2D group to facilitate wireless communication between a network (such as a base station of the network) and at least one of the UE devices in the D2D group. Examples of this described above include the master UE device determining helper/target combinations/configurations, or the master UE device setting up (and/or helping the network set up) a decode-and-forward, aggregation or proxy service. In general, coordinating D2D communications to facilitate wireless communication between the network and one or more of the UE devices may or may not be on behalf of the network. For example, the network may instruct the D2D coordination and/or the network may instruct the master UE device to perform a certain action or service (e.g. set up a decode-and-forward), which may result in the master UE device coordinating particular D2D communications.

More generally, the master UE device does not necessarily have to coordinate D2D communications amongst the plurality of UE devices specifically to facilitate a wireless communication between the network and one or more of the UE devices. The master UE device could, for example, coordinate a D2D communication between two UE devices for data exchange, with or without network involvement. For example, a first UE device in a D2D group may want to exchange data with a second UE device in the D2D group, and so the master UE device may coordinate this. For example, the master UE device may control use of the wireless channel for the D2D transmission (that is, control when the D2D data exchange may occur to avoid interference with the D2D transmissions of other UE devices). In some cases, this could be done without the network even knowing. Alternatively, the D2D coordination could be on behalf of the network. For example, the network may realize that a first UE device is to transmit information to a second UE device and those two UE devices are in the same D2D group, which is being coordinated by a master UE device. The network may then inform the master UE device that the information exchange is to occur directly. The master UE device may then coordinate (e.g. schedule and/or control) a D2D communication between the first UE device and the second UE device so that the first UE device can directly transmit the information from the first UE device to the second UE device. This is only an example. More generally, the network could offload tasks to the master UE device that relate to communications between UE devices in the group.

Figure 13:
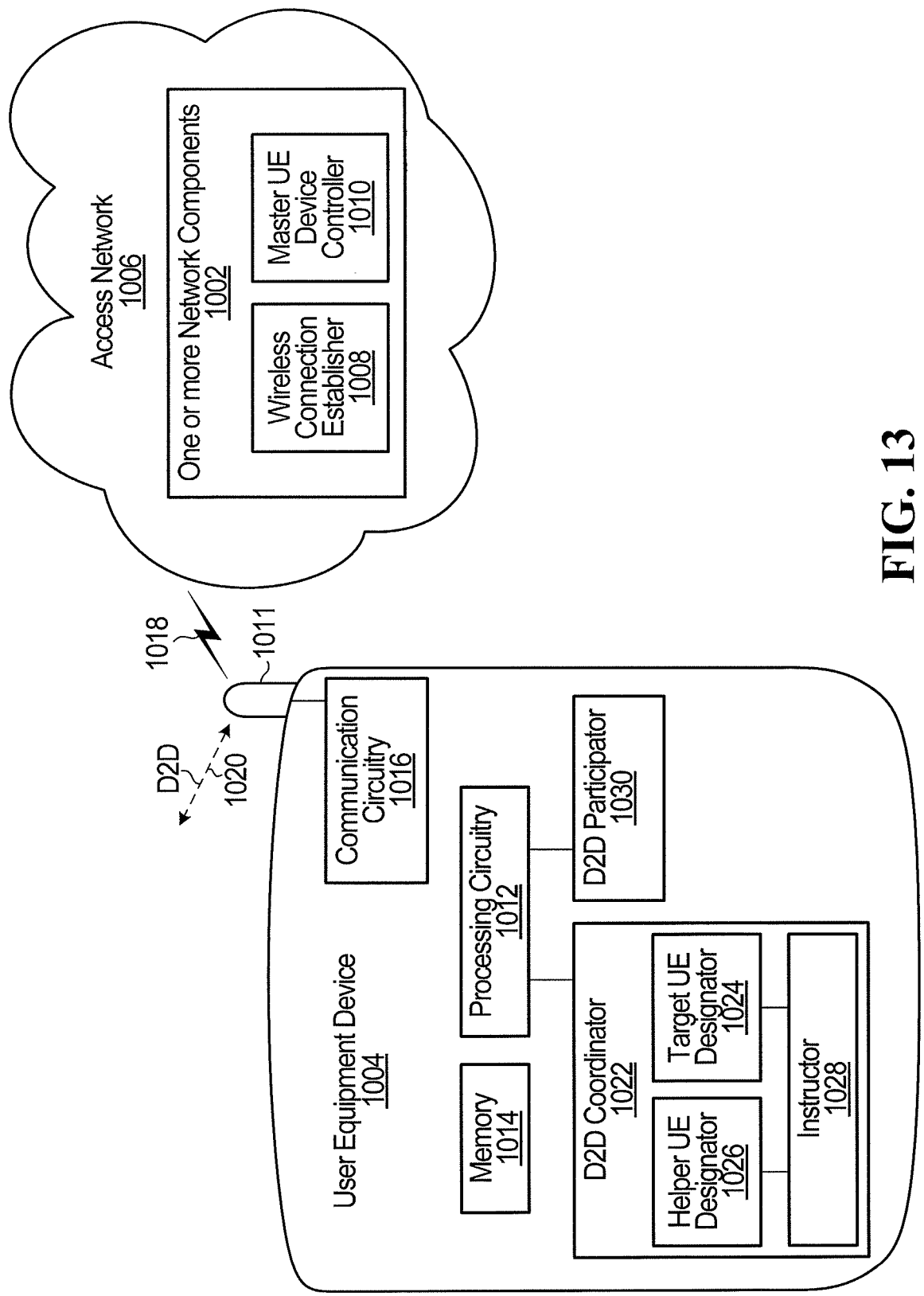
FIG. 13 shows an example of an access network and UE device in accordance with one embodiment.

Another Example UE Device and Access Network:

FIG. 13 shows another example of a UE device 1004 and an access network 1006. The access network 1006 includes one or more network components 1002. The one or more network components 1002 may include at least one processing device for performing operations of the network 1006, such as those described above. The network components may include components such as one or more severs, switches, and/or routers. The one or more network components 1002 may include at least one base station, or a base station itself may hold the one or more network components 1002. The one or more network components 1002 may comprise a memory having instructions stored thereon that, when executed, cause the network 1006 to perform the network operations described earlier. Shown as part of the one or more network components are a wireless connection establisher 1008 for establishing a wireless connection with UE devices, and a master UE device controller 1010 for controlling the master UE device to cause it to perform the operations described above.

The UE device 1004 includes one or more antennas 1011 (shown as a single antenna in FIG. 13 for ease of illustration), processing circuitry 1012, and memory 1014. The UE device 1004 also includes communication circuitry 1016 to control the one or more antennas 1011 to communicate with the access network 1006 (as at 1018) and to perform D2D communications with other devices (as at 1020). The UE device 1004 also includes a D2D coordinator 1022, which includes a target UE designator 1024 to determine that a particular UE device (a target UE device) is to have assistance with wireless communication between the target UE device and a base station. The D2D coordinator 1022 also includes a helper UE designator 1026 to determine whether another UE device is to assist the target UE device. The D2D coordinator 1022 further includes an instructor 1028 to instruct other UE devices (and in particular their D2D participators) to perform the D2D communications as coordinated.

The UE device 1004 also includes a D2D participator 1030 to receive instructions from the D2D coordinator 1022 (or from a D2D coordinator of another UE device), the instructions relating to coordinating the D2D communications, and implementing those instructions.

Although different UE device modules are shown as separate blocks in FIG. 13 (e.g. the D2D coordinator 1022 is shown separately from the D2D participator 1030), it will be appreciated that they may be implemented by the same hardware in the UE device 1004 or as one unit or set of instructions executed by a processing device (e.g. the processor 1012). Also, although different network modules are shown as separate blocks in FIG. 13, it will be appreciated that they may also be implemented by the same hardware in the network 1006 or as one unit or set of instructions executed by a processing device (e.g. at a server) in the network 1006.

CONCLUSION

Figure 14:
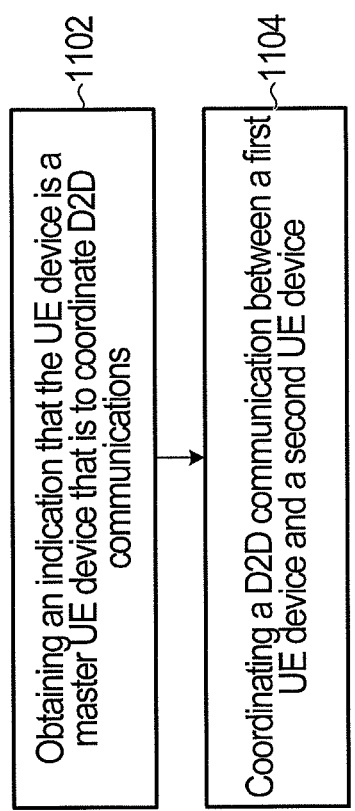
FIG. 14 shows an example method performed by a UE device in accordance with one embodiment.

Given all of the variations above, it will be appreciated that in one aspect there is provided more generally a method performed by a master UE device comprising coordinating a D2D communication between two UE devices. FIG. 14 is one such example method, and the method of FIG. 14 could be performed, for example, by a D2D coordinator in the master UE device. In step 1102, the UE device obtains (e.g. receives) an indication that the UE device is a master UE device that is to coordinate D2D communications amongst a plurality of UE devices. The plurality of UE devices includes the master UE device. The indication received may be from the network, from one or more of the plurality of devices, or from the UE device itself (e.g. if it is the one that ultimately chooses the master UE device, and it chooses itself, or if a user of the UE device indicates that it is to be the master UE device, or if the UE device is configured upon power-up to be a master UE device, which may be the case if it is a "dummy" UE device).

In step 1104, the master UE device coordinates a D2D communication between a first UE device of the plurality of UE devices and a second UE device of the plurality of UE devices. In some embodiments the first or the second UE device may be the master UE device itself. In some embodiments, one of the first and second UE devices is a target UE device, and the other is a helper UE device. In some embodiments, the master UE device may transmit an instruction to at least the first UE device to coordinate the D2D communication. In this case, the second UE device can be the master UE device or another UE device.

In some embodiments, the master UE device may determine that assistance is to occur for a wireless communication between the network and a third UE device of the plurality of UE devices, where the third UE device is different from the first UE device and the second UE device. The master UE device may instruct the second UE device to use D2D communication between the second UE device and the third UE device to perform the assistance. The master UE device may control wireless channel access for the D2D communication between the second UE device and the third UE device to mitigate interference with the D2D communication between the second UE device and the first UE device.

In some embodiments, the master UE device may perform a reconfiguration after a period of time has elapsed. For example, the master UE device may determine that assistance is still to occur with a wireless communication between the first UE device and the network, but the master UE device may determine that a third UE device is now to assist (instead of the second UE device). The master UE device may then instruct the second UE device to no longer assist and instruct the third UE device to use D2D communication between the third UE device and the first UE device to assist with the wireless communication between the first UE device and a base station of the network.

In some embodiments, step 1104 may comprise transmitting an instruction to the second UE device that instructs the second UE device to: receive data from a base station of the network, use the D2D communication to transmit a first portion of the data to the first UE device, and use another D2D communication to transmit a second portion of the data to a third UE device of the plurality of UE devices.

FIG. 14 is from the perspective of the master UE device. A method is also provided that can be performed by a first UE device, involving receiving an instruction from a second UE device, where the instruction coordinates a D2D communication between the first UE device and a third UE device. The first UE device then communicates with the third UE device using the D2D communication based on the instruction. The second UE device could be considered the master UE device and the first UE device a slave UE device. The first UE device may comprise a D2D participator to perform the actions of the first UE device.

In some embodiments a system is also disclosed comprising: at least one base station to wirelessly communicate with at least one of a plurality of UE devices that are in physical proximity to each other, at least two of the plurality of UE devices able to directly communicate with each other using D2D communication; and processing circuitry configured to obtain and send to at least a master UE device of the plurality of UE devices an indication of one or more actions that are to be performed by the master UE device to coordinate D2D communications amongst the plurality of UE devices.

Through the descriptions of the preceding embodiments, it will be appreciated that the present invention may be implemented by using hardware only or by using software and a necessary universal hardware platform. Based on such understandings, the technical solution of the present invention may be embodied in the form of a software product. The software product may be stored in a non-volatile and/or non-transitory storage medium, which may be, for example, a CD-ROM, USB flash disk, or a removable hard disk. The software product includes a number of instructions that enable a computer device (e.g. processor, server, or network device) to execute the methods provided in the embodiments of the present invention.

Although the present invention has been described with reference to specific features and embodiments thereof, it is evident that various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A computer-implemented method comprising:
receiving respective information from each user equipment (UE) of a plurality of UEs in a device-to-device (D2D) group;
comparing the information from each UE to one or more selection criteria, and identifying a first UE from which particular information was received that satisfies the one or more selection criteria;
selecting the first UE as a master UE, wherein the master UE coordinates D2D communications between the plurality of UEs in the D2D group;
selecting a different second UE as a target UE, wherein the target UE is a UE that is assisted with wireless communication between the target UE and a base station via a coordinated D2D communication;
selecting another different third UE as a helper UE, wherein the helper UE is a UE that assists with the wireless communication between the target UE and the base station via the coordinated D2D communication; and
transmitting at least one message to the first UE that indicates that the first UE is the master UE and that indicates both the target UE and the helper UE to the first UE.

2. The computer-implemented method of claim 1, further comprising:
receiving updated information from the first UE;
comparing the updated information to the one or more selection criteria;
in response to the updated information no longer satisfying the one or more selection criteria: selecting a different UE in the D2D group to instead be the master UE.

3. The computer-implemented method of claim 2, wherein selecting the different UE to instead be the master UE comprises:
receiving respective updated information from each UE in the D2D group;
comparing the updated information from each UE to the one or more selection criteria, and identifying the updated information received from the different UE as satisfying the one or more selection criteria;
in response to identifying the updated information received from the different UE as satisfying the one or more selection criteria: selecting the different UE to instead be the master UE.

4. The computer-implemented method of claim 1, wherein the one or more selection criteria comprises quality of a wireless communication link, wherein the information received from each UE in the D2D group is indicative of the quality of the wireless communication link between the UE from which the information was received and a network, and wherein the particular information indicates that the quality of the wireless communication link between the first UE and the network is above a predetermined threshold; and wherein the method further comprises determining that the quality of the wireless communication link between the target UE and the network is below the predetermined threshold, and determining that the quality of the wireless communication link between the helper UE and the network is above a particular threshold.

5. The computer-implemented method of claim 4, wherein the information received from each UE in the D2D group is also indicative of a quality of the wireless communication link between the UE from which the information was received and another UE in the D2D group, and wherein the particular information also indicates that the quality of the wireless communication link between the first UE and the helper UE is above another predetermined threshold, and wherein the method further comprises determining that the quality of the wireless communication link between the target UE and the helper UE is above another particular threshold.

6. The computer-implemented method of claim 1, wherein the method is performed by a network.

7. The computer-implemented method of claim 1, wherein the method is performed by one of the plurality of UEs in the D2D group.

8. The computer-implemented method of claim 1, wherein prior to selecting the first UE as a master UE, the method further comprises:
sending a first message to the first UE, the first message requesting that the first UE be the master UE; and
receiving a response from the first UE, the response indicating that the first UE is willing to be the master UE.

9. The computer-implemented method of claim 1, further comprising transmitting, to at least the target UE and the helper UE, a command to begin taking instructions from the master UE.

10. The computer-implemented method of claim 1, further comprising transmitting, to the first UE, an indication of one or more actions that are to be performed by the master UE to coordinate the D2D communications.

11. An apparatus comprising:
a receiver to receive respective information from each user equipment (UE) of a plurality of UEs in a device-to-device (D2D) group;
a processing device to:
compare the information from each UE to one or more selection criteria, and identify a first UE from which particular information was received that satisfies the one or more selection criteria;
select the first UE as a master UE, wherein the master UE coordinates D2D communications between the plurality of UEs in the D2D group; and
select a different second UE as a target UE, wherein the target UE is a UE that is assisted with wireless communication between the target UE and a base station via a coordinated D2D communication;
select another different third UE as a helper UE, wherein the helper UE is a UE that assists with the wireless communication between the target UE and the base station via the coordinated D2D communication;
a transmitter to transmit at least one message to the first UE that indicates that the first UE is the master UE and that indicates both the target UE and the helper UE to the first UE.

12. The apparatus of claim 11, wherein:
the receiver is to receive updated information from the first UE;

the processing device is to compare the updated information to the one or more selection criteria;

in response to the updated information no longer satisfying the one or more selection criteria: the apparatus is to select a different UE in the D2D group to instead be the master UE.

13. The apparatus of claim 12, wherein the apparatus is to select the different UE to instead be the master UE by:

receiving respective updated information from each UE in the D2D group;

comparing the updated information from each UE to the one or more selection criteria, and identifying the updated information received from the different UE as satisfying the one or more selection criteria;

in response to identifying the updated information received from the different UE as satisfying the one or more selection criteria: selecting the different UE to instead be the master UE.

14. The apparatus of claim 11, wherein the one or more selection criteria comprises quality of a wireless communication link, wherein the information received from each UE in the D2D group is indicative of the quality of the wireless communication link between the UE from which the information was received and a network, and wherein the particular information indicates that the quality of the wireless communication link between the first UE and the network is above a predetermined threshold; and wherein the processing device is to determine that the quality of the wireless communication link between the target UE and the network is below the predetermined threshold, and is to determine that the quality of the wireless communication link between the helper UE and the network is above a particular threshold.

15. The apparatus of claim 14, wherein the information received from each UE in the D2D group is also indicative of a quality of the wireless communication link between the UE from which the information was received and another UE in the D2D group, and wherein the particular information also indicates that the quality of the wireless communication link between the first UE and the helper UE is above another predetermined threshold, and wherein the method further comprises determining that the quality of the wireless communication link between the target UE and the helper UE is above another particular threshold.

16. The apparatus of claim 11, wherein the apparatus comprises one or more network components, and the one or more network components implement the transmitter, the receiver, and the processing device.

17. The apparatus of claim 11, wherein the apparatus is one of the plurality of UEs in the D2D group.

18. The apparatus of claim 11, wherein prior to selecting the first UE as a master UE:

the transmitter is to send a first message to the first UE, the first message requesting that the first UE be the master UE; and the receiver is to receive a response from the first UE, the response indicating that the first UE is willing to be the master UE.

19. The apparatus of claim 11, wherein the transmitter is to transmit, to at least the target UE and the helper UE, a command to begin taking instructions from the master UE.

20. The apparatus of claim 11, wherein the transmitter is to transmit, to the first UE, an indication of one or more actions that are to be performed by the master UE to coordinate the D2D communications.

* * * * *